United States Patent
Post et al.

(10) Patent No.: US 10,515,606 B2
(45) Date of Patent: Dec. 24, 2019

(54) PARALLELIZING DISPLAY UPDATE

(71) Applicant: Samsung Electronics Co., Ltd., Gyeonggi-Do (KR)

(72) Inventors: Ernest Rehmatulla Post, San Francisco, CA (US); Sergio Perdices-Gonzalez, Milpitas, CA (US); Sajid Sadi, San Jose, CA (US); Iliya Tsekov, Sofia (BG)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 90 days.

(21) Appl. No.: 15/717,818

(22) Filed: Sep. 27, 2017

(65) Prior Publication Data

US 2018/0090096 A1     Mar. 29, 2018

Related U.S. Application Data

(60) Provisional application No. 62/401,031, filed on Sep. 28, 2016, provisional application No. 62/484,311, filed on Apr. 11, 2017.

(51) Int. Cl.
*G09G 3/36* (2006.01)
*G09G 5/00* (2006.01)
(Continued)

(52) U.S. Cl.
CPC ......... *G09G 3/3692* (2013.01); *G09G 3/2022* (2013.01); *G09G 3/2092* (2013.01);
(Continued)

(58) Field of Classification Search
CPC .. G09G 3/3692; G09G 3/2022; G09G 3/3611; G09G 3/3651; G09G 2310/04;
(Continued)

(56) References Cited

U.S. PATENT DOCUMENTS 6,177,919 B1 * 1/2001 Numao ............... G09G 3/3629
345/94
8,077,537 B2 12/2011 Kawakubo et al.
(Continued)

FOREIGN PATENT DOCUMENTS

KR    1020140125820 A    7/2014
KR    1020140091352 A    10/2014
(Continued)

OTHER PUBLICATIONS

WIPO Appln. PCT/KR2017/010861, International Search Report and Written Opinion, dated Jan. 23, 2018, 11 pg.
(Continued)

*Primary Examiner* — Xuemei Zheng
(74) *Attorney, Agent, or Firm* — Cuenot, Forsythe & Kim, LLC

(57) ABSTRACT

A target image can be analyzed determine a respective level of visual saliency for each of a plurality of information presented in the target image. At least a first sub-frame update for a display panel can be determined, the at least first sub-frame update providing at least a partial rendering of the target image on the display panel, the at least partial rendering of the target image providing the information presented in the target image that is determined to have a highest level of visual saliency from among the plurality of information. The at least first sub-frame update can be applied to the display panel.

27 Claims, 14 Drawing Sheets

(51) Int. Cl.
*G09G 3/20* (2006.01)
*G02F 1/137* (2006.01)
*G09G 3/3216* (2016.01)

(52) U.S. Cl.
CPC ....... *G09G 3/3651* (2013.01); *G02F 1/13781* (2013.01); *G09G 3/3216* (2013.01); *G09G 3/3611* (2013.01); *G09G 3/3622* (2013.01); *G09G 2300/06* (2013.01); *G09G 2310/0208* (2013.01); *G09G 2310/0213* (2013.01); *G09G 2310/04* (2013.01); *G09G 2320/0252* (2013.01); *G09G 2330/021* (2013.01); *G09G 2340/16* (2013.01); *G09G 2352/00* (2013.01); *G09G 2360/16* (2013.01); *G09G 2370/08* (2013.01)

(58) Field of Classification Search
CPC ..... G09G 2320/0646; G09G 2330/021; G09G 2340/016
See application file for complete search history.

(56) References Cited

U.S. PATENT DOCUMENTS

| | | | |
|---|---|---|---|
| 8,497,885 | B2 | 7/2013 | Ikeda et al. |
| 8,830,213 | B2 | 9/2014 | Allen |
| 8,883,021 | B2 | 11/2014 | Chang et al. |
| 8,950,682 | B1 | 2/2015 | Zehr et al. |
| 9,325,948 | B2 | 4/2016 | Ma et al. |
| 9,378,697 | B2 | 6/2016 | Fujioka et al. |
| 9,401,128 | B1 | 7/2016 | Jepsen |
| 9,424,805 | B2 | 8/2016 | Lee et al. |
| 9,462,190 | B2 | 10/2016 | Nishihara et al. |
| 9,465,502 | B2 | 10/2016 | Hotelling et al. |
| 9,466,239 | B2 | 10/2016 | Kishi |
| 9,466,250 | B2 | 10/2016 | Toyomura et al. |
| 2006/0279501 | A1 | 12/2006 | Lu et al. |
| 2009/0257666 | A1* | 10/2009 | Kondou ............... H04N 19/139 382/233 |
| 2010/0085280 | A1 | 4/2010 | Lambert et al. |
| 2013/0127886 | A1 | 5/2013 | Subramanian et al. |
| 2013/0194295 | A1 | 8/2013 | Chan et al. |
| 2014/0097348 | A1 | 4/2014 | Watanabe et al. |
| 2014/0204067 | A1 | 7/2014 | Gupta |
| 2014/0233629 | A1 | 8/2014 | Lipman et al. |

FOREIGN PATENT DOCUMENTS

| | | |
|---|---|---|
| WO | 2006035248 A1 | 4/2006 |
| WO | 2018062911 A1 | 4/2018 |

OTHER PUBLICATIONS

"Non-negative matrix factorization," [online] Wikipedia, the free encyclopedia, Updated Sep. 6, 2017 [retrieved Sep. 27, 2017], Retrieved from the Internet: <https://en.wikipedia.org/wiki/Non-negative_matrix_factorization>, 14 pg.

"Prinicipal component analysis," [online] Wikipedia, the free encyclopedia, Updated Sep. 17, 2017 [retrieved Sep. 27, 2017], Retrieved from the Internet: <https://en.wikipedia.org/wiki/Principal_component_analysis>, 24 pg.

"Wavelet transform," [online] Wikipedia, the free encyclopedia, Updated Sep. 16, 2017 [retrieved Sep. 27, 2017], Retrieved from the Internet: <https://en.wikipedia.org/wiki/Wavelet_transform>, 7 pg.

"Hadamard matrix," [online] Wikipedia, the free encyclopedia, Updated Mar. 31, 2017 [retrieved Sep. 27, 2017], Retrieved from the Internet: <https://en.wikipedia.org/wiki/Hadamard_matrix>, 7 pg.

"Quadratic unconstrained binary optimization," [online] Wikipedia, the free encyclopedia, Updated Jun. 21, 2017 [retrieved Sep. 27, 2017], Retrieved from the Internet: <https://en.wikipedia.org/wiki/Quadratic_unconstrained_binary_optimization>, 1 pg.

Yabe, Y. et al., "Control and Synchronization Scheme for Parallel Image Processing RAM with 128 Processor Elements and 16Mb DRAM," In Proceedings of the IEEE Custom Integrated Circuits Conference,1996, pp. 363-366.

Boros, E. et al., "Local Search Heuristics for Quadratic Unconstrained Binary Optimization (QUBO)," Journal of Heuristics, Apr. 2007, vol. 13, Bo. 2, pp. 99-132.

Barbosa, J. et al., "Parallel Image Processing System on a Cluster of Personal Computers," In Int'l. Conf. on Vector and Parallel Processing, pp. 439-452, 2000.

"MIPI Display Interface Controller," Solomon Systech Limited © Apr. 2013, 2 pg.

Lee, D.D. et al., "Algorithms for Non-Negative Matrix Factorization," In Advances in Neural Information Processing Systems, pp. 556-562, 2001.

Lee, D.D. et al., "Learning the parts of objects by non-negative matrix factorization," In Nature, vol. 401, No. 6755, 4 pg., Oct. 21, 1999.

EP Appl. 17856797.0, Extended European Search Report, Jul. 19, 2019, 10 pages.

Tavakoli, H.R. et al., "Saliency detection using joint temporal and spatial decorrelation," In Scandinavian Conference on Image Analysis, Jun. 17, 2013 (pp. 707-717). Springer, Berlin, Heidelberg.

Zhou, J. et al., "Multiscale saliency detection using principle component analysis," In the 2012 International Joint Conference on Neural Networks (IJCNN) Jun. 10, 2012 (pp. 1-6). IEEE.

* cited by examiner

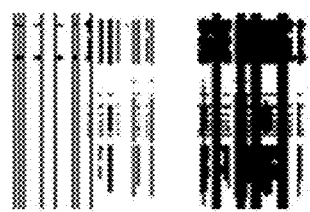
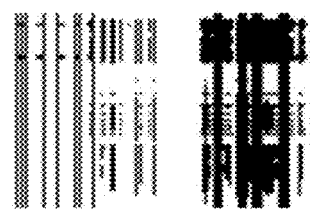
FIG. 7A　　　　　　　　　　FIG. 7B
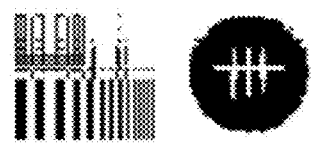
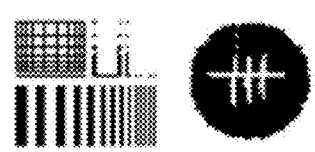
FIG. 7C　　　　　　　　　　FIG. 7D
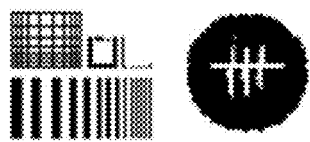
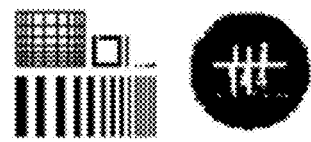
FIG. 7E　　　　　　　　　　FIG. 7F
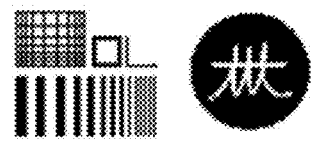
FIG. 7G　　　　　　　　　　FIG. 7H
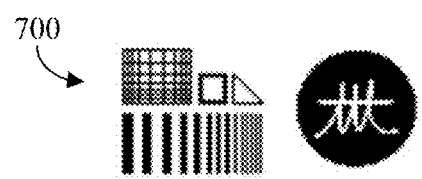
FIG. 7I　　　　　　　　　　FIG. 7J

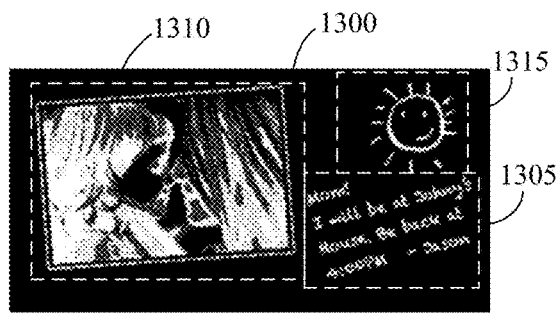
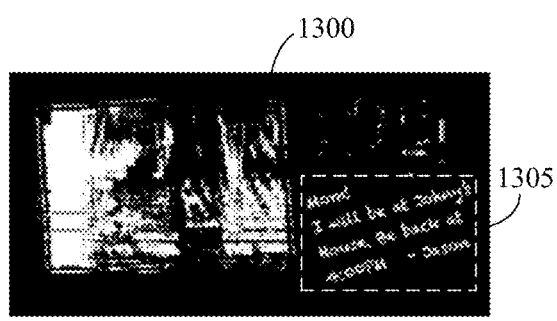
FIG. 13A  FIG. 13B
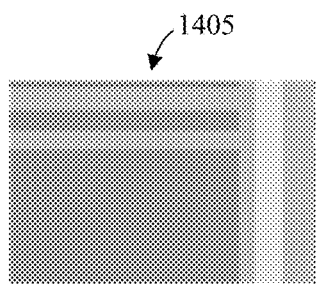
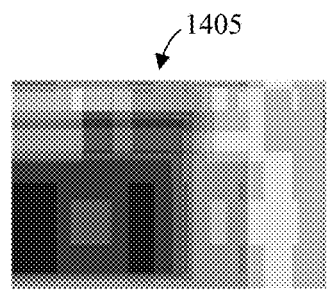
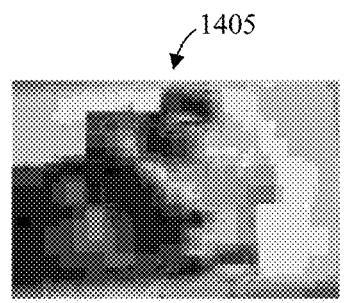
FIG. 14A  FIG. 14B  FIG. 14C
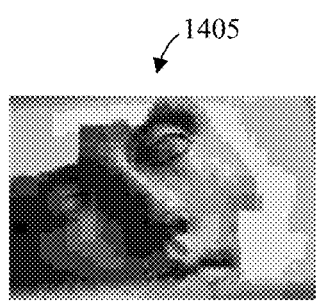
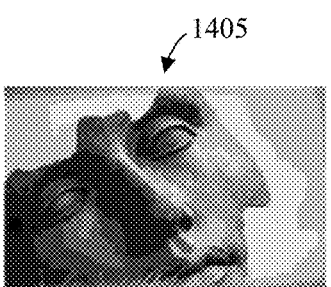
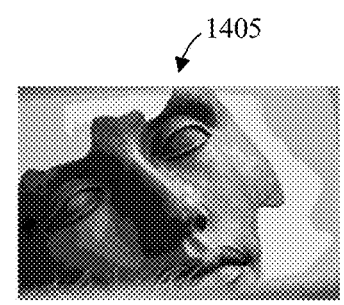
FIG. 14D  FIG. 14E  FIG. 14F

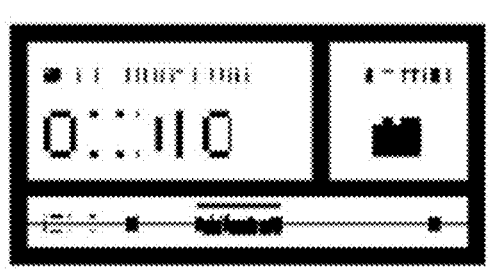
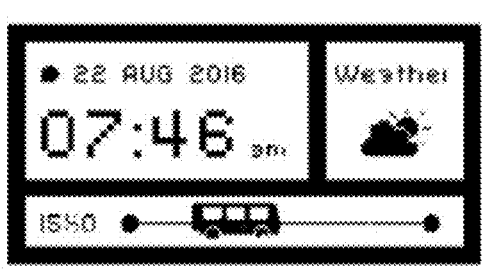
FIG. 17A  FIG. 17B
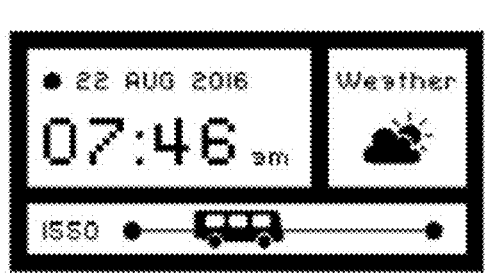
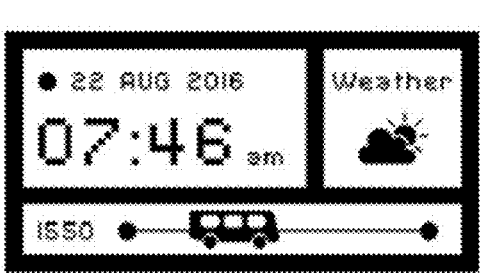
FIG. 17C  FIG. 17D
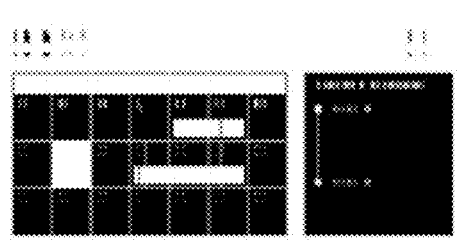
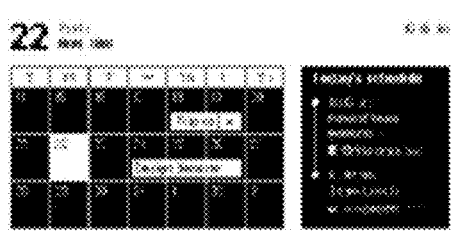
FIG. 18A  FIG. 18B
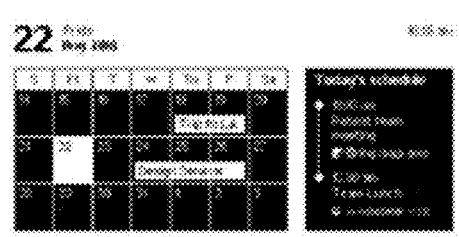
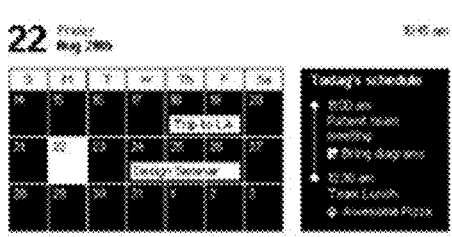
FIG. 18C  FIG. 18D

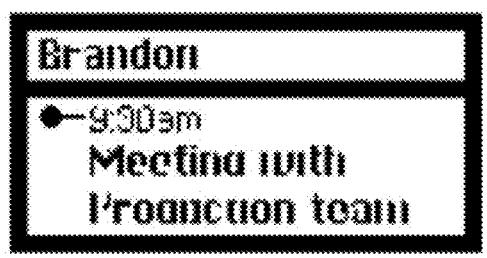 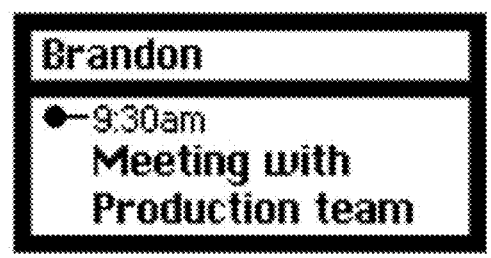
FIG. 19A			FIG. 19B
 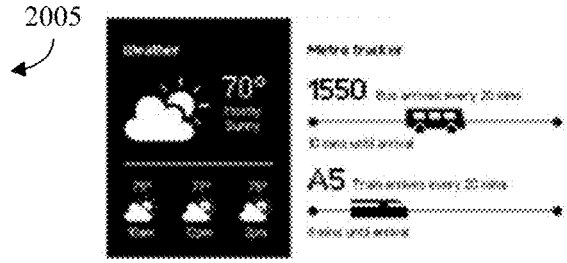
FIG. 20A			FIG. 20B
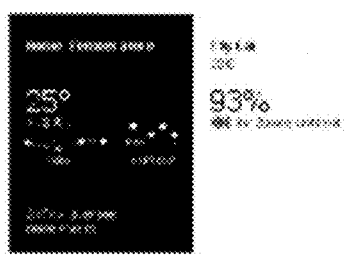 
FIG. 21A			FIG. 21B

PARALLELIZING DISPLAY UPDATE

CROSS-REFERENCE TO RELATED APPLICATIONS

This application claims the benefit of U.S. Application No. 62/401,031 filed on Sep. 28, 2016 and U.S. Application No. 62/484,311 filed on Apr. 11, 2017, which are fully incorporated herein by reference.

TECHNICAL FIELD

This disclosure relates to electronic devices.

BACKGROUND

Passive matrix displays are a type of electronic display. Passive matrix displays are normally driven serially (i.e., one row or column at a time). Nearly all commercially available display technologies are driven by voltages or currents imposed along their periphery that address individual pixels by their row and column positions within a matrix. The most common method of driving a matrix display is to select each row (or column) in turn while the signals to drive its pixels are imposed along the entire column (or row). In this way, the entire display is driven sequentially row by row, typically at a frequency above the human visual system's flicker fusion threshold (i.e., 24 Hz to 60 Hz). In many cases, displays are driven row-by-row because there are fewer rows than columns in the most common display aspect ratios (e.g. 4:3, 16:9, etc.).

SUMMARY

A method can include analyzing a target image to determine a respective level of visual saliency for each of a plurality of information presented in the target image. The method also can include determining, using a processor, at least a first sub-frame update for a display panel, the at least first sub-frame update providing at least a partial rendering of the target image on the display panel, the at least partial rendering of the target image providing the information presented in the target image that is determined to have a highest level of visual saliency from among the plurality of information. The method also can include applying the at least first sub-frame update to the display panel.

An apparatus includes a display panel and a display driver, wherein the display driver is configured to initiate executable operations. The executable operations can include analyzing a target image to determine a respective level of visual saliency for each of a plurality of information presented in the target image. The executable operations also can include determining at least a first sub-frame update for the display panel, the at least the first sub-frame update providing at least a partial rendering of the target image on the display panel, the at least partial rendering of the target image providing the information presented in the target image that is determined to have a highest level of visual saliency from among the plurality of information. The executable operations also can include applying the at least first sub-frame update to the display panel.

A computer program product includes a computer readable storage medium having program code stored thereon, the program code executable by a processor to perform operations. The operations can include analyzing a target image to determine a respective level of visual saliency for each of a plurality of information presented in the target image. The operations also can include determining at least a first sub-frame update for a display panel, the at least the first sub-frame update providing at least a partial rendering of the target image on the display panel, the at least partial rendering of the target image providing the information presented in the target image that is determined to have a highest level of visual saliency from among the plurality of information. The operations also can include applying the at least first sub-frame update to the display panel.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIGS. 7A-7J depict various stages of an image being rendered by selectively exciting pixels in a parallel manner to display the image.

FIGS. 13A and 13B depict an example target image in which pixels in a sub-frame of the target image are prioritized when rendering the image.

FIGS. 14A-14F depict an example of various stages of rendering an image in accordance with the arrangements described herein.

FIGS. 17A-17D depict another example of various stages of rendering an image in accordance with the arrangements described herein.

FIGS. 18A-18D depict another example of various stages of rendering an image in accordance with the arrangements described herein.

FIGS. 19A and 19B depict another example of various stages of rendering an image in accordance with the arrangements described herein.

FIGS. 20A and 20B depict another example of various stages of rendering an image in accordance with the arrangements described herein.

FIGS. 21A and 21B depict another example of various stages of rendering an image in accordance with the arrangements described herein.

DETAILED DESCRIPTION

Figure 1:
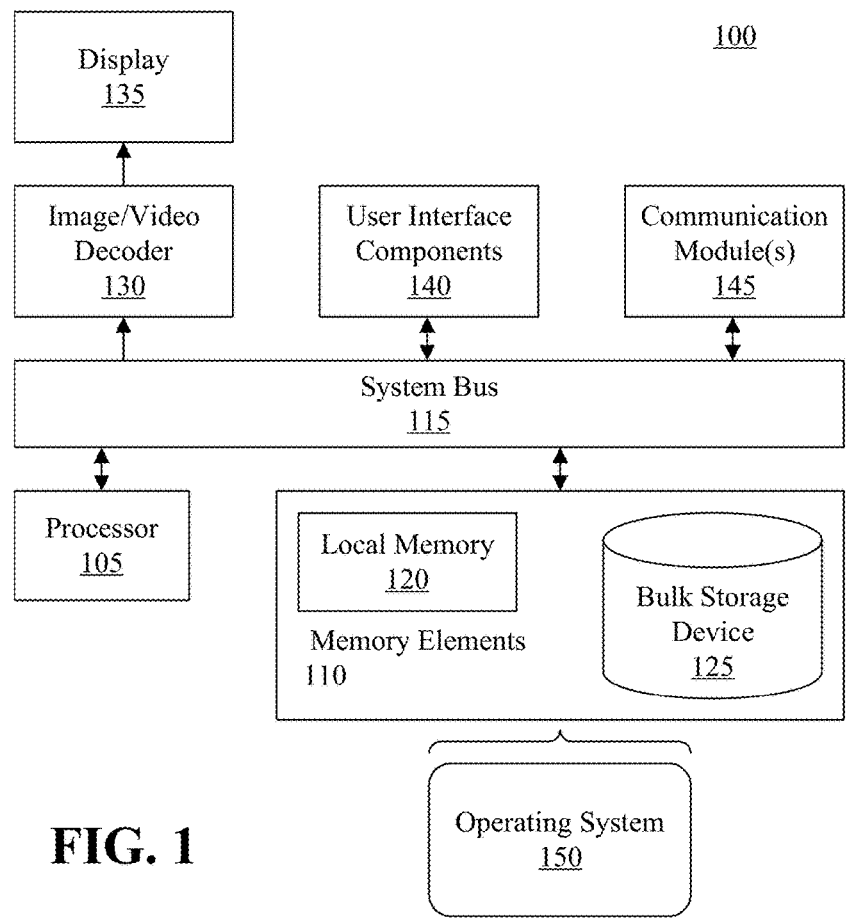
FIG. 1 is a block diagram illustrating example architecture for an apparatus.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to improving the performance and power efficiency of electronic displays and, more particularly, reducing an amount of time used to render images on electronic displays. One aspect of the present arrangements, for example, implements a method to find a sequence of sub-frame updates (not necessarily driven row by row) which provides the human user with partial information during the intermediate "sub-frames" and displays the full frame not slower than the conventional row by row method. By analyzing an image to be displayed and driving rows and columns in parallel to create the image, a display panel can be driven more efficiently in terms of update rate and power consumption.

Further, several arrangements described herein pertain to methods to drive a passive matrix display in which pixels are excited by the difference of voltages applied to (or currents flowing through) their row and column electrodes. In most commercial displays, the display medium (e.g. nematic liquid crystal, LED, etc.) responds to applied signals faster than the flicker fusion period. However, the present arrangements provide methods of driving display media that respond much more slowly or that are bistable (e.g. smectic A liquid crystal display media). An aspect of the present arrangements includes driving a slow display in parallel to increase its effective update rate. For example, consider a bistable passive matrix display of 100×100 pixels with a pixel response time of 1 second. The typical row-sequential update method discussed above would therefore take 100 seconds to update the entire display.

However, if instead multiple rows and columns of the display are driven in parallel to update blocks of multiple pixels simultaneously, the entire display can be updated significantly faster, thereby increasing the effective update rate of the display panel. Furthermore, a parallel display update method can be chosen to reduce power requirements (arising from dissipation due to row/column/pixel capacitance) and to accommodate various perceptual models (e.g., as an image is displayed it appears to "come into focus").

For passive matrix displays, this can lead to an additional issue. Since a passive matrix display does not have a switch at the intersection of every row and column, the display typically activates both the target and a diagonally-reflected ghost pixel when multiple rows and columns are activated.

The present arrangements can take advantage of the fact that the display asymmetrically switches to one state faster than the other. As a result, methods described herein can choose to turn a large area preferentially to one state, and then "go back" to flip any additional pixels that were changed during a previous pass.

In illustration, a target image can be analyzed to determine a respective level of visual saliency of various information presented in the target image. At least a first sub-frame update for a display panel can be determined. The first sub-frame update can provide at least a partial rendering of the target image on the display panel, for example a portion of the target image. The partial rendering of the target image can provide the information presented in the target image that is determined to have a highest level of visual saliency. The first sub-frame update can be applied to the display panel. Further, additional sub-frame updates can be determined and applied until the target image is fully rendered on the display panel.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating example architecture 100 for an apparatus. The architecture 100 may be used to implement any of a variety of systems and/or devices that include a display and that are capable of performing the operations described within this disclosure. In some cases, the particular device implemented using architecture 100 may include fewer components or more components. Further, the particular operating system and/or application(s) included may vary.

Examples implementations of the architecture 100 may include, but are not to limited to, a television, a panel display, a smart phone or other mobile device or phone, a wearable computing device (e.g., smart watch, fitness tracker, patch, etc.), a computer (e.g., desktop, laptop, tablet computer, other data processing system, etc.), and any suitable electronic device capable of presenting images/video on a display. Furthermore, it will be appreciated that embodiments can be deployed as a standalone device or deployed as multiple devices in a distributed client-server networked system. In an example embodiment, a smart watch or fitness tracker may be paired to operate with a mobile phone. The mobile phone may or may not be configured to interact with a remote server and/or computer system.

As pictured, the architecture 100 includes at least one processor, e.g., a central processing unit (CPU), 205 coupled to memory elements 110 through a system bus 115 or other suitable circuitry. The architecture 100 stores program code within the memory elements 110. The processor 105 executes the program code accessed from memory elements 110 via the system bus 115. The memory elements 110 include one or more physical memory devices such as, for example, a local memory 120 and one or more bulk storage devices 125. Local memory 120 refers to random access memory (RAM) or other non-persistent memory device(s) generally used during actual execution of the program code. The bulk storage device 125 may be implemented as a hard disk drive (HDD), solid state drive (SSD), or other persistent data storage device. The architecture 100 also may include one or more cache memories (not shown) that provide temporary storage of at least some program code in order to reduce the number of times program code must be retrieved from bulk storage device 125 during execution.

The architecture 100 also may include an image/video decoder 130 coupled to the processor 105 via the system bus 115. The image/video decoder 130 also can be coupled to a display 135. The display 135 can be, for example, a passive matrix display, such as a bistable passive matrix display.

The architecture 100 also can include user interface components 140. The user interface components 140 can include, for example, input/output (I/O) devices such as a keyboard, a pointing device, etc. In some cases, one or more of the I/O devices may be combined as in the case where a touchscreen is used as the display panel 205. In that case, the display panel 205 may also implement a keyboard (e.g., a virtual keyboard) and a pointing device. The user interface components 140 may be coupled to the architecture 100 either directly or through intervening I/O controllers.

One or more communication modules 145 may also be coupled to the architecture 100 to enable the architecture 100 to become coupled to other systems, computer systems, remote printers, and/or remote storage devices through intervening private or public networks. Modems, cable modems, Ethernet cards, and wireless transceivers are examples of different types of communication modules 145 that may be used with the architecture 100. Depending upon the particular device implemented with the architecture 100, the specific type of communication module 145, or communication modules 145 as the case may be, may vary.

As pictured in FIG. 1, memory elements 110 store an operating system 150 and, optionally, one or more applications. In one aspect, the operating system 150 and application(s), being implemented in the form of executable program code, are executed by the architecture 100. As such, the operating system 150 and application(s) may be considered an integrated part of the architecture 100. The operating system 150, application(s), and any data items used, generated, and/or operated upon by the architecture 100 are functional data structures that impart functionality when employed as part of a device, apparatus or system implemented using the architecture 100.

Figure 2:
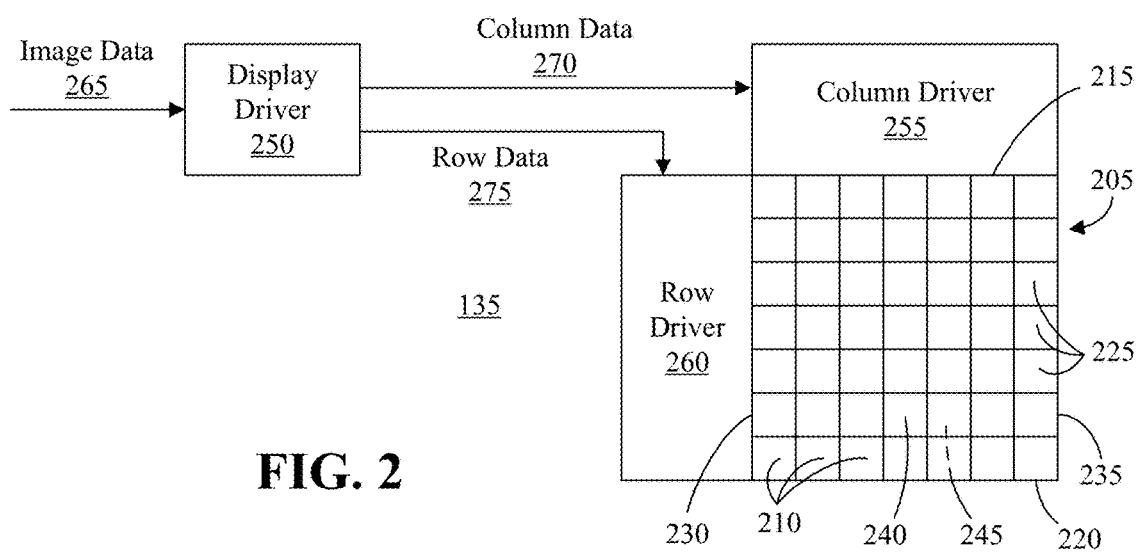
FIG. 2 is a block diagram illustrating an example of a display.

FIG. 2 is a block diagram illustrating an example of the display 135 of FIG. 1. The display 135 can include a display panel 205. The display panel 205 can include any suitable display medium, for example a nematic liquid crystal medium, a light emitting diode (LED) medium, a smectic A liquid crystal medium, etc. The display panel 205 can include a plurality pixels (not shown) embedded in the display panel 205. The display panel 205 also can include a plurality of column electrodes 210 extending vertically from approximately a top edge 215 of the display panel 205 to approximately a bottom edge 220 of the display panel 205. Further, the display panel 205 also can include a plurality of row electrodes 225 extending horizontally from approximately a left edge 230 of the display panel 205 to approximately a right edge 235 of the display panel 205. The column electrodes 210 can be disposed on a first side 240 of the display panel 205 and the row electrodes 225 can be disposed on an opposing second side 245 of the display panel 205. The column electrodes 210 and row electrodes 225 can spatially intersect in the horizontal and vertical dimensions where pixels are located in the display panel 205. In this regard, the column electrodes 210 and row electrodes 225 can define an electrode matrix corresponding to a matrix of pixels contained in the display panel 205, wherein the column electrodes 210 are aligned with one axis (e.g., a vertical axis) and the row electrodes 225 are aligned with another axis (e.g., a horizontal axis).

The display 135 also can include a display driver 250, a column driver 255 and a row driver 260. The display driver 250 can be operatively coupled to the column driver 255 and to the row driver 260. The column driver 255 can be operatively coupled to the column electrodes 210 of the display panel 205, and the row driver 260 can be operatively coupled to row electrodes 225 of the display panel 205.

In operation, the image/video decoder 130 (FIG. 1) can output image data 265 to the display driver 250. The image data 265 can define images (e.g., still images or video) to be presented on the display panel 205. The display driver 250 can process the image data 265 to drive the display panel 205 in order to present images. In illustration, the display driver 250 can include at least hardware circuit and memory configured process the image data 265, for example using one or more algorithms described herein, to determine a manner in which to optimally update the display panel 205 to present images. Based on such processing, the display driver 250 can generate column data 270 and row data 275. The display driver 250 can communicate the column data 270 to the column driver 255, and communicate the row data 275 to the row driver 260.

Responsive to receiving the column data 270, the column driver 255 can apply electrical signal(s) to one or more of the column electrodes 210. Responsive to receiving the row data 275, the row driver 260 can apply electrical signal(s) to one or more of the row electrodes 225. Depending on the nature of the electrical signals applied to the column electrodes 210 and row electrodes 225, pixels located at intersections of column electrodes 210 and row electrodes 225 having applied electrical signals can be selectively excited. In this regard, a pixel can be driven by the combination of the electrical signals imposed on the row and column electrodes between which the pixel lies. Further, the applied electrical signals can be selected to set color/grayscale characteristics of pixels that are excited. For example, respective voltage levels, current levels and/or frequencies of the electrical signals can be selected to set desired color/gray scale characteristics of the pixels.

Figure 3A:
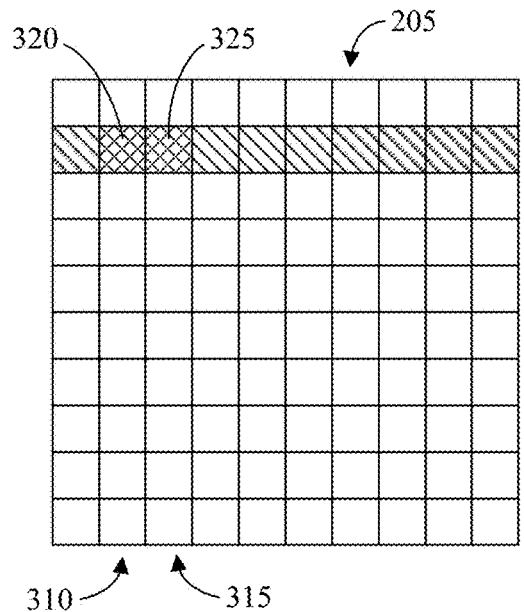
FIGS. 3A and 3B are diagrams depicting an example of exciting pixels in a serial manner to display an image.
Figure 3B:
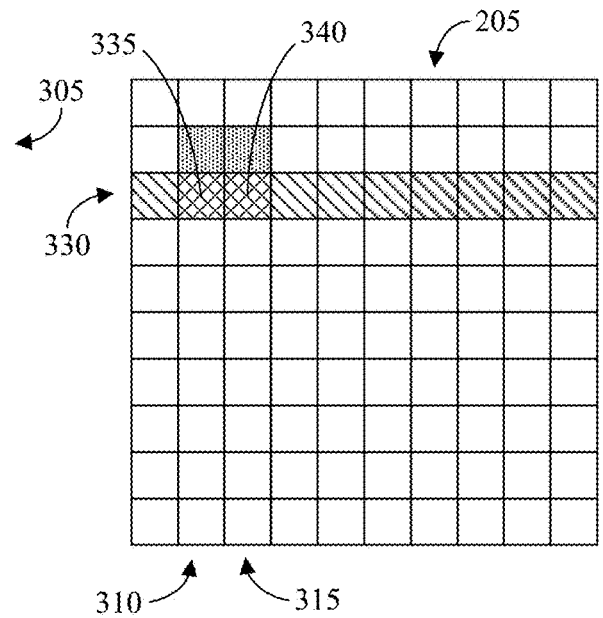

FIGS. 3A and 3B are diagrams depicting an example of exciting pixels 300 in a serial manner to display an image, for example using a row-sequential update method. FIGS. 3A and 3B depict a matrix of pixels of the display panel 205 controlled by column and row electrodes (e.g., the column electrodes 210 and row electrodes 225 of FIG. 2).

Referring to FIG. 3A, an electrical signal can be applied to a row electrode for a row of pixels 305. Sequentially, an electrical signal can be applied to a column electrode for a column of pixels 310, then another electrical signal can be applied to a column electrode for a column of pixels 315. This can result in pixels 320, 325 being sequentially excited. Next, referring to FIG. 3B, an electrical signal can be applied to a row electrode for a next row of pixels 330 and, sequentially, an electrical signal can be applied to the column electrode for a column of pixels 310, then another electrical signal can be applied to the column electrode for a column of pixels 315. In this manner, the entire display panel 205 can be driven sequentially, row by row, at a frequency above the human visual system's flicker fusion threshold (i.e., 24 Hz to 60 Hz). In other arrangements, rather than sequentially driving the display panel 205 row by row, the display panel 205 can be driven column by column, though the row by row method may be more efficient if there are fewer rows than columns.

Regardless, the process described can result in pixels 335, 340 being excited. Although nematic liquid crystal and LED displays can respond to applied electrical signals much faster than the flicker fusion period, exciting pixels in the serial manner shown in FIGS. 3A and 3B can be slow when the process is applied to certain types of displays, such as a bistable passive matrix display panel (e.g., a bistable passive matrix liquid crystal display panel using a smectic A liquid crystal medium).

For example, consider a bi-stable passive matrix display of 100×100 pixels with a pixel response time of 1 second. The typical row-sequential update method discussed above would therefore take 100 seconds to update the entire display. In addition to the long refresh period, the serial update produces a lot of intermediate "sub-frames" (partially displayed images) visible to the human user. Various arrangements described herein, however, can implement a method to find a sequence of sub-frame updates (not necessary driven row by row or column by column) which provides the human user with partial information during the intermediate "sub-frames" and displays the full frame not slower than the conventional row by row method.

Figure 4A:
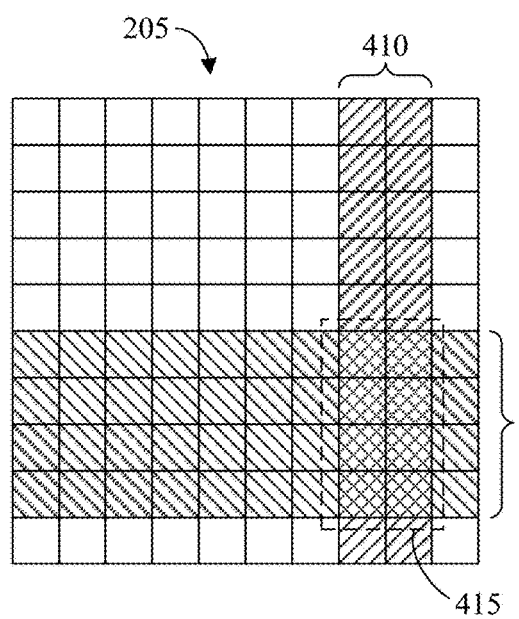
FIGS. 4A and 4B are diagrams depicting an example of exciting pixels in a parallel manner to display an image.
Figure 4B:
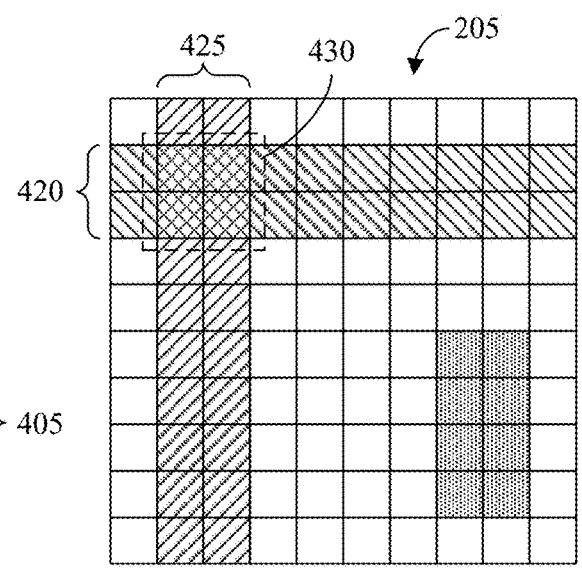

In illustration, parallel column/row updates can be applied to excite the pixels of the display panel 205 in a parallel manner, for example as shown in FIGS. 4A and 4B. In contrast to exciting pixels in a serial manner, referring to FIG. 4A, electrical signals can be simultaneously applied to a plurality of row electrodes and a plurality of column electrodes in order to simultaneously drive a plurality of pixels at their intersections. By driving multiple rows and columns of the display in parallel to update blocks of multiple pixels simultaneously, the entire display panel 205 can be updated significantly faster. Furthermore, a parallel display update method can be chosen to increase the visual saliency of the intermediate sub-frames to accommodate various perceptual models (e.g., as an image is displayed it appears to "come into focus," or a text box or object in an image is displayed in "full focus" much faster than the whole image).

By way of example, electrical signals can be simultaneously applied to row electrodes for rows of pixels 405 and to column electrodes for columns of pixels 410. Accordingly, a plurality of pixels 415 spanning multiple columns and multiple rows can be simultaneously excited. Next, referring to FIG. 4B, electrical signals can be simultaneously applied to row electrodes for rows of pixels 420 and column electrodes for columns of pixels 425. Accordingly, another plurality of pixels 430 spanning multiple columns and multiple rows can be simultaneously excited. Thus, in comparison to the process shown in FIG. 3, the process of FIG. 4 can excite a much greater number of pixels in an equivalent amount of time. The process shown in FIG. 4 can be especially advantageous when applied to a bistable passive matrix display panel, for which switching pixels between activated and deactivated states is relatively slow, though switching a pixel from an activated state to a deactivated state is asymmetrically faster than switching the pixel from the deactivated state to the activated state.

Figure 5:
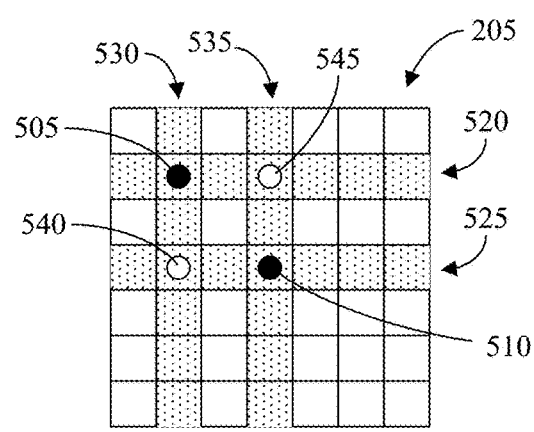
FIG. 5 is diagram depicting another example of exciting pixels in a parallel manner to display an image.

FIG. 5 is diagram depicting another example of exciting pixels to display an image. In this example, assume that it is desired to activate pixels 505, 510 of the display panel 205. To activate the pixels 505, 510, electrical signals can be applied to row electrodes for a row of pixels 520 and a row of pixels 525, and electrical signals can be applied to column electrodes for a column of pixels 530 and a column of pixels 535. A side effect of such activation is that pixels 540, 545 also may be activated since they are positioned between row and column electrodes to which the electrical signals are applied. In other words, the drive signals applied to the display panel 205 can be mathematically described as a function of the product of two matrices R and C, wherein R represents the electrical signals used to drive the rows of pixels 520, 525 and C represents the represents the electrical signals used to drive the columns of pixels 530, 535. Activation of the pixels 505, 510, 540, 545 results from such product.

Nonetheless, after being activated, the pixel 540 can be deactivated by applying respective electrical signals to a column electrode and row electrode that intersect at the pixel 540, and the pixel 545 can be deactivated by applying respective electrical signals to a column electrode and row electrode that intersect at the pixel 545. The pixels of the display panel 205 can switch from an activated state to a deactivated state asymmetrically faster than switching from the deactivated state to the activated state. Thus, simultaneously activating the pixels 505, 510, and then deactivating the pixels 540, 545 can occur faster than sequentially activating the pixels 505, 510. The time savings can be compounded when larger numbers of pixels are simultaneously activated.

Figure 6A:
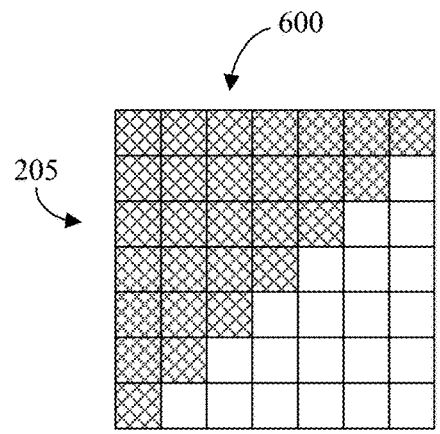
FIGS. 6A-6E are diagrams depicting another example of exciting pixels in a parallel manner to display an image.

FIGS. 6A-6E are diagrams depicting another example of exciting pixels in a parallel manner to display an image. In particular, FIG. 6A depicts a target image 600, represented by cross-hatching, to be presented on the display panel 205. FIGS. 6B-6E depict a process of selective activating and deactivating pixels in a parallel manner in order to present the target image 600 on the display panel 205.

Figure 6B:
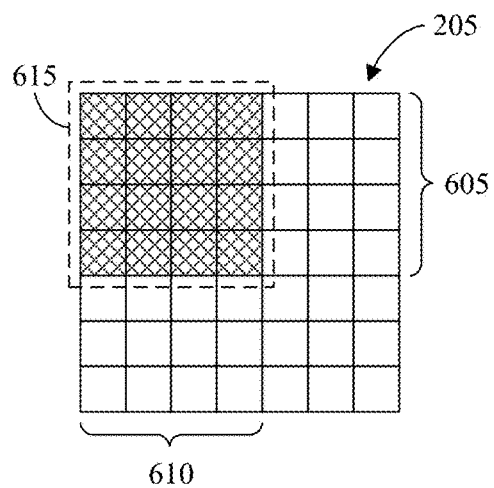
Figure 6C:
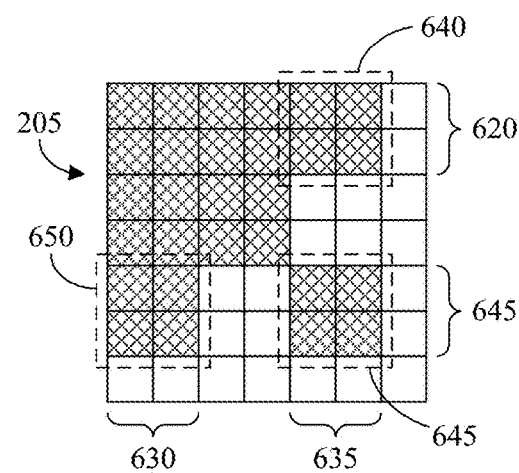
Figure 6D:
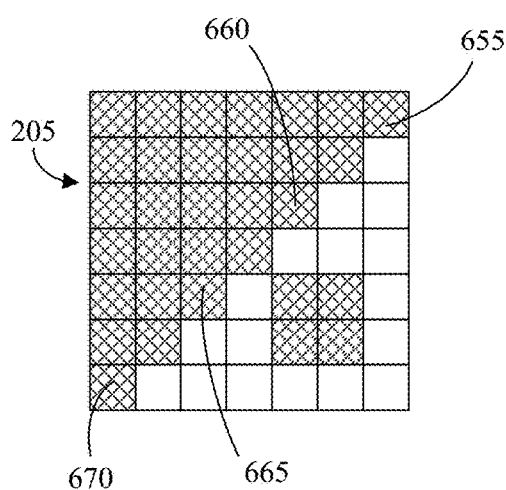
Figure 6E:
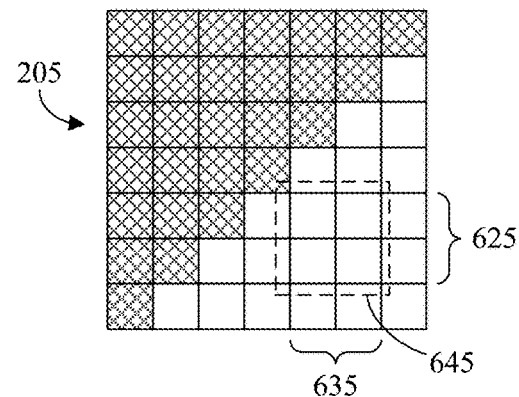

Referring to FIG. 6B, during a first pixel excitation cycle, appropriate electrical signals for activating pixels can be simultaneously applied to row electrodes for rows of pixels 605 and to column electrodes for columns of pixels 610. Accordingly, a group of pixels 615 spanning multiple columns and multiple rows can be simultaneously activated. Referring to FIG. 6C, during a next pixel excitation cycle, appropriate electrical signals for activating pixels can be simultaneously applied to row electrodes for rows of pixels 620, 625 and to column electrodes for columns of pixels 630, 635. Accordingly, groups of pixels 640, 645, 650 can be simultaneously activated. Referring to FIG. 6D, during subsequent pixel excitation cycles, pixels 655, 660, 665, 670 can be sequentially activated by applying appropriate electrical signals to the row electrodes and column electrodes that intersect where the respective pixels 655, 660, 665, 670 are located. In this example, the number of excitation cycles can equal the number of pixels 655, 660, 665, 670 sequentially activated. Referring to FIG. 6E, during a next pixel excitation cycle, appropriate electrical signals for deactivating pixels can be simultaneously applied to row electrodes for rows of pixels 625 and to column electrodes for columns of pixels 635. Accordingly, groups of pixels 640, 645, 650 can be simultaneously deactivated.

In this example, the image depicted in FIG. 6A can be reproduced using seven (7) pixel excitation cycles. In contrast, if each of the pixels used to present the image were sequentially activated, twenty eight pixel (28) excitation cycles would be required. Accordingly, the process described in this example for activating pixels is much more efficient than conventional sequential pixel activation processes. Moreover, an approximation of the image is formed very quickly in comparison to the sequential pixel activation process, and that approximation can be optimized through subsequent pixel activation/deactivation processes. This allows the display panel 205 to appear to be far more responsive.

An additional optimization process can use the asymmetric nature of the pixel response (one state is switched faster than the other) to produce an excess of pixels in one state, keeping in mind that the reversal of the extra pixels can occur much faster compared to the initial state change.

One subtlety of the parallel pixel excitation process is that the display driving circuitry (250, 255, 260 of FIG. 2) may produce a multiplicative excitation of pixels at the row/column intersections. This multiplicative excitation can be implemented in various ways. For example, one arrangement can include driving rows with voltages proportional to row values while columns are switched between a reference voltage and a high-impedance state. The columns can be switched using a pulse-width modulated (PWM) signal with a period shorter than a time constant of the display medium.

FIGS. 7A-7J depict various stages of an image being rendered by selectively exciting pixels in a parallel manner to display the image. In this example, a target image is a binary bitmap having 88 rows by 232 columns. Conventional row-sequential addressing would require 88 different row selections and various column selections to display the entire image. In contrast, the parallel addressing method described herein yields a recognizable image within a few addressing periods, with more detail "coming into focus" with each successive update. In this example, proceeding through various phases of image reproduction shown in FIGS. 7A, 7B, 7C, 7D, 7E, 7F, 7G, 7H, 7I, 7J takes 38 excitation cycles. After 38 excitation cycles, the target image 700 is seen to be faithfully reproduced in FIG. 7J.

Further aspects of the present arrangements now will be described.

Display State and Sub-Frame Update

The display state of a display panel can be modeled as a discrete matrix as follows:

$$D \in \{0, 1, 2, \ldots, q\}^{M \times N}$$

Where a black pixel is identified as 0, a white pixel as q, ($q \in \mathbb{N}$), and values between 0 and q represent uniform grayscale.

Every sub-frame update can be identified by a pair of row and column binary vectors, corresponding to the activated rows and columns, and a discrete variable (between $-q$ and q, not including 0) identifying the change in grayscale as follows:

$$r \in \{0,1\}^{1 \times N}$$

$$c \in \{0,1\}^{M \times 1}$$

$$w \in \{-q, \ldots, -1\} \cup \{1, \ldots, q\}$$

Every selected row can correspond to a 1 in c and every selected column can correspond to a 1 in r. The updated pixels will be at the intersection of the selected row and column, i.e. at the 1's in the matrix c*r. w specifies the grayscale update, with w>0 representing update that makes pixel more white, and w<0–black (e.g. w=-q will make a white pixel black).

Due to saturation, if an update to the display pixels is applied, their state will remain in the [0, q] range, hence we can define a display squashing function as follows:

$$f_{display}(x) = \min(\max(x, 0), q)$$

E.g., if an update with w=q (pixels white) is applied at a pixel with state q (white pixel), the pixel will remain at state q (white).

The sub-frame update becomes:

$$D_{updated} := f_{display}(D_{pre-updated} + w(c*r))$$

Display Frame

A frame, i.e., the transition from the current display state to a desired display state, can be an ordered set of sub-frame updates, for example as follows:

$K$–number of sub frame updates $C \in \{0, 1, \ldots, q\}^{M \times N}$–initial display state $A \in \{0, 1, \ldots, q\}^{M \times N}$–final display state $\{r^{(k)}\}_{k=1}^{K} \in \{0,1\}^{1 \times N \times K}$–row vectors of each update $\{c^{(k)}\}_{k=1}^{K} \in \{0,1\}^{M \times 1 \times K}$–column vectors of each update $\{w^{(k)}\}_{k=1}^{K} \in \{\{-q, \ldots, -1\} \cup \{1, \ldots, q\}\}^{K}$–discrete variables of each update $\{B^{(k)}\}_{k=0}^{K} \in \{0,1, \ldots, q\}^{M \times N \times K}$–intermediate display states, where $B^{(0)} := C$ $$B^{(K)} := A$$

$$B^{(k)} := f_{display}(B^{(k-1)} + w^{(k)}(c^{(k)} * r^{(k)})), \text{ for } k=1, \ldots, K$$

For every A and C K, $\{r^{(k)}\}_{k=1}^{K}$, $\{c^{(k)}\}_{k=1}^{K}$ and $\{w^{(k)}\}_{k=1}^{K}$ can be found such that the sequence $\{B^{(k)}\}_{k=0}^{K}$ is optimized to be perceived by the user as "fast," i.e., the displayed intermediate results start to visually approximate the target image as quickly as possible.

Visual Saliency Difference

The term "visual saliency difference" is defined herein as a subjective perceptual quality which characterizes how items look different or similar to one another. Converting a subjective quality into a measurable quantity can be implemented by approximating the visual saliency difference it with a difference function $d_{saliency}(.,.)$:

$$d_{saliency}: \{0, 1, \ldots, q\}^{M \times N} \times \{0, 1, \ldots, q\}^{M \times N} \to \mathbb{R}_0^+$$

wherein for every two images $D_1$ and $D_2$ a non-negative number $d = d_{saliency}(D_1, D_2)$ is assigned. The number d can characterize how different image $D_2$ is from $D_1$, with $d_{saliency}(D_1, D_2) = 0$ only if the two images are identical. A variety of difference functions that may be used to determine the difference between images, but $L_1$ norm function, which is a vector norm function known in the art, offers a very good combination of visual performance and computational efficiency. A variety of alternatives can substitute the $L_1$ norm function in a straight forward manner.

In addition, some regions of the image might present information of higher visual importance and/or higher visual saliency. Visual importance, here, is used to describe a subjective relative quantity characterizing how much value a pixel/area in the image has to the user. For example, objects, such as text in a memo, familiar faces, sports game scores, movie captions, etc. can be determined to have high value to the user, and can be assigned respective values. The values can be predetermined values assigned to various objects, or values assigned to the objects based in a suitable algorithm. The identification of these objects can be performed with known OCR or object recognition algorithms, predefined areas of interest of the picture, or simply be specified as metadata of the image. The present arrangements, however, are not limited to a particular method for identification of these objects/areas, and various solutions are known to exist in the art. Visual saliency of an object/area represents how much one area attracts the user attention compared to other areas. For example, a user's eyes may be drawn to details of human faces, and users may seldom pay attention to the fine details in clouds or structures. Thus, human faces can be assigned a value of visual saliency that is higher that a value of visual saliency assigned to clouds or structures.

In illustration, for an image D, an importance mask, $M_{importance}(D)$, can be constructed. The importance mask can be a matrix, the size of the image D, having non-negative values corresponding to the importance of each pixel in D. For example, if an area in the image D is determined to contain valuable information, the corresponding submatrix of $M_{importance}(D)$ can have values that are higher than a submatrix of $M_{importance}(D)$ a for an area in the image D that is determined not to contain valuable information. For instance, a display mask, $d_{display}(D_1, D_2, M_{importance}(D_1))$, can be generated.

To achieve a visually fast transition from a current image C to a target image A, the difference between $B^{(k)}$ (the current display sub-frame) and the target image can be minimized. The method can use this greedy approach to find $r^{(k)}$, $c^{(k)}$, and $w^{(k)}$ that minimizes $d_{display}(A, B^{(k)}, M_{importance}(A))$ given $B^{(k-1)}$, the previous sub-frame.

In illustration, such algorithm can include the following steps:
1. Initialize $B_0:=C$ and $k:=0$
2. While $B_k \neq A$ (as a whole matrix):
   2.1. Find $\{r, c, w\}:=\arg\min_{r,c,w} d_{display}(A, f_{display}(B^{(k-1)}+w(c*r))$
   2.2. Assign:
      $r^{(k)}:=r$
      $c^{(k)}:=c$
      $w^{(k)}:=w$
      $B^{(k)}:=f_{display}(B^{(k-1)}+w^{(k)}(c^{(k)}*r^{(k)}))$
   2.3. Increment $k:k:=k+1$
3. Finalize: $K:=k$ The distance function $d_{display}(.,.)$ can be determined using a vector norm function, such as $L_1$ norm, and implemented as follows:

$$d_{display}(D_1, D_2, M_{importance}(D_1)) \equiv \|(D_1 - D_2) * M_{importance}(D_1)\|_1 = \sum_{(i,j)} |D_1(i,j) - D_2(i,j)| * M_{importance}^{(i,j)}(D_1)$$

For implementing the search the following definition of a neighborhood can be used:

$$N_{\{r,c\}} \equiv \{\{r',c'\} \in \{0,1\}^{1 \times N} \times \{0,1\}^{M \times 1}: |r-r'|_1 \leq 1 \text{ and } |c-c'|_1 \leq 1\}$$

wherein $\{r', c'\}$ is a neighbor of $\{r, c\}$ if they differ at most in one element of r and at most in one element of c.

The algorithm can be implemented follows:
2.1.1. Define: $\Delta(r, c, w) \equiv d_{display}(A, f_{display}(B^{(k-1)}+w(c*r)))-d_{display}(A, B^{(k-1)})$
2.1.2. For every $w \in \{\{-q, \ldots, -1\} \cup \{1, \ldots, q\}\}$:
2.1.2.1. Randomly select $\{r, c\}$, such that:
  $d_{display}(A, f_{display}(B^{(k-1)}+w(c*r))) < d_{display}(A, B^{(k-1)})$
2.1.2.2. $\Delta:= d_{display}(A, f_{display}B^{(k-1)}+w(c*r)))-d_{display}(A, B^{(k-1)})$
2.1.2.3. While $\Delta > 0$
2.1.2.3.1. $\{r', c'\}:=\arg\min_{\{r',c'\} \in N_{\{r,c\}}} \Delta(r', c', w)$
2.1.2.3.2. Update: $\Delta:=\Delta(r, c, w)-\Delta(r', c', w)$
2.1.2.3.3. Update: $\{r, c\}:=\{r', c'\}$
2.1.2.4. $\{r_w, c_w\}:=\{r, c\}$
2.1.2.5. $\Delta_w:=\Delta(r_w, c_w, w)$
2.1.3. $\{r^{(k)}, c^{(k)}, w^{(k)}\}:=\arg\min_{\{r_w,c_w,w\}} \Delta_w$ The arg min search in steps 2.1.2.3.1 and 2.1.3 can be done explicitly. Detailed information on efficiently calculating $\Delta(r, c, w)$ in the neighborhood of $\{r, c, w\}$ is provided below.

Common Notations and Definitions

The following are common notations and definitions used herein.
$1_L \equiv \alpha L \times 1$ vector with 1's as its elements
$1_{L,P} \equiv \alpha L \times P$ vector with 1's as its elements
$e_L^{(l)} \equiv \alpha L \times 1$ unit vector with 1 at $l^{th}$ position and 0 everywhere else
$e_{L \times P}^{(l,p)} \equiv \alpha L \times P$ matrix with 1 at position (l, p) and 0 everywhere else
$L_1$-norm for any $A \in \mathbb{R}^{N_1 \times N_2 \times \cdots \times N_m}$:
$\|A\|_1 = \sum_{n_1=1}^{N_1} \sum_{n_2=1}^{N_2} \cdots \sum_{n_m=1}^{N_m} |A(n_1, n_2, \ldots, n_m)|$ A Computationally Efficient Method for Finding $\arg\min_{\{r',c'\} \in N_{\{r,c\}}} \Delta(r', c', w)$ The method for finding $\arg\min_{\{r',c'\} \in N_{\{r,c\}}} \Delta(r', c', w)$ can include:

1. Find the following matrices during a first iteration:
   dB
   $:=|A$
   $-f_{display}(B^{(k-1)})$
   $+w(c*r))|$, where $|\cdot|$ is taken element wise
   $dB_r:=|A-f_{display}(B^{(k-1)}+w(c*(1_N^T-r)))|$
   $dB_c:=|A-f_{display}(B^{(k-1)}+w((1_M-c)*r))|$
   $dB_{rc}:=|A-f_{display}(B^{(k-1)}+w((1_M-c)*(1_N^T-r)))|$ a. If it is the first iteration of step 2.1.2.3 above can be looped, and the matrices can be computed directly.
   b. If it is not the first iteration, previous values of matrices can be used and appropriate rows and columns can be swapped.

2. Compute during the first iteration:
   $d = 1_M^T * dB * 1_N$
   $d_r = 1_M^T * (dB_r - dB) + d*1_N^T$
   $d_c = (dB_c - dB) * 1_N + d*1_M$
   $d_{rc} = (dB_c - dB) * 1_N + d*1_M$ 3. Find $\min\{d, d_r(n), d_c(m), (d_{rc}(n, m)\}$ and extract the $\{r', c'\}$ corresponding to it.
4. Update $\{d, d_r(n), d_c(m), d_{rc}(n, m)\}$.

Proof and Details

The following equations provide proof and details for various algorithms described herein.

If $r'_n$ and $c'_n$ are defined as follows:
$r'_n \in \{0,1\}^{1 \times N}: r'_n(j) = r(j)$ for $j \neq n$ and $r'_n(n) = 1 - r(n)$
$c'_m \in \{0,1\}^{M \times 1}: c'_m(i) = c(i)$ for $i \neq m$ and $c'_m(m) = 1 - c(m)$ The neighborhood of $\{r, c\}$ becomes:
$N_{(r,c)} = \{\{r;c\}, \{r'_n c\}_n, \{r;c'_m\}_m, \{r'_n c'_m\}_{n,m}\}$ Hence, if $d$, $d_r$, $d_c$ and $d_{rc}$ are defines as:
$d := d_{display}(A, f_{display}(B^{(k-1)}+w(c*r)))$
$d_r := [d_r(n)]_{n=1}^N \in \mathbb{N}^{1 \times N}$ for $d_r(n)$
$:= d_{display}(A, f_{display}(B^{(k-1)}+w(c*r'_n)))$
$d_c := [d_c(m)]_{m=1}^M \in \mathbb{N}^{M \times 1}$ for $d_c(m) := d_{display}(A, f_{display}(B^{(k-1)}+w(c'_m*r)))$ $d_{rc} := [d_{rc}(n,m)]_{n,m=1}^{N,M} \in \mathbb{N}^{M \times N}$ for $d_{rc}(n,m)$ $:= d_{display}(A, f_{display}(B^{k-1} + w(c'_m * r'_n)))$ The following sets are equivalent:

$\{\Delta(r',c',w)\}_{\{r',c'\} \in N_{\{r,c\}}} \equiv \{d, d_r(n), d_c(m), d_{rc}(n,m)\}$ $\min_{\{r',c'\} \in N_{\{r,c\}}} d_{display}(A, f_{display}(B^{(k-1)} + w(c'*r'))) = \min\{d, d_r(n), d_c(m), d_{rc}(n,m)\}$ The optimum $\{r', c'\}$ are easily extracted.

To efficiently compute the minimum of $\{d, d_r(n), d_c(m), d_{rc}(n, m)\}$, the following matrices are computed:

$dB := |A - f_{display}(B^{(k-1)} + w(c*r))|$, where $|.|$ is taken element wise $dB_r := |A - f_{display}(B^{(k-1)} + w(c*(1_N^T - r)))|$ $dB_c := |A - f_{display}(B^{(k-1)} + w((1_M - c)*r))|$ $dB_{rc} := |A - f_{display}(B^{(k-1)} + w((1_M - c)*(1_N^T - r)))|$ Since: $d_{display}(D_1, D_2) = \sum_{i,j} d_{display}(D_1(i,j), D_2(i,j))$ $d = \sum_{i=1}^{M} \sum_{j=1}^{N} d_{display}(A(i,j), f_{display}(B^{(k-1)}(i,j) + w(c(i)*r(j)))) = \sum_{i=1}^{M} \sum_{j=1}^{N} dB(i,j)$ $d = 1_M^T * dB * 1_N$ Similarly for $d_r$:

$d_r(n) = \sum_{i=1}^{M} \sum_{\substack{j=1 \\ j \neq n}}^{N} dB(i,j) + \sum_{i=1}^{M} dB_r(i,n) =$ $\sum_{i=1}^{M} \sum_{j=1}^{N} dB(i,j) + \sum_{i=1}^{M} dB_r(i,n) - \sum_{i=1}^{M} dB(i,n)$ $d_r(n) = d + 1_M^T * (dB_r - dB) * e_N^{(n)}$ $d_r = \sum_{n=1}^{N} d_r(n) * e_N^{n^T} = \sum_{n=1}^{N} \left(d * e_N^{(n)^T} + 1_M^T * (dB_r - dB) * e_N^{(n)} * e_N^{n^T}\right)$ $d_r = d * \sum_{n=1}^{N} e_N^{(n)^T} + 1_M^T * (dB_r - dB) * \sum_{n=1}^{N} e_{N \times N}^{(n,n)} =$ $d * 1_N^T + 1_M^T * (dB_r - dB) * I_{N \times N}$ $d_r = 1_M^T * (dB_r - dB) + d * 1_N^T$ Following similar steps:

$d_c = (dB_c - dB) * 1_N + d * 1_M$ $d_{rc} = dB_{rc} - dB_r - dB_c + dB + 1_M * d_r + d_c * 1_N^T - d*(1_M*1_N^T)$

In addition, after the optimum of $\{r', c'\}$ is found, the update of $\{dB, dB_r, dB_c, dB_{rc}\}$ for $\{r, c\} := \{r', c'\}$ corresponds to exchanging some rows and columns between $dB$, $dB_r$, $dB_c$, and $dB_{rc}$. Explicitly:

Case 1: $\{r', c'\} \equiv \{r'_n, c\}$ $dB(:,n) \leftrightarrows dB_r(:,n)$ $dB' = dB + (dB_r - dB) * e_{N \times N}^{(n,n)^T}$ $dB'_r = dB_r + (dB - dB_r) * e_{N \times N}^{(n)^T}$ $dB_c(:,n) \leftrightarrows dB_{rc}(:,n)$ $dB'_c = dB_c + (dB_{rc} - dB_c) * e_{N \times N}^{(n,n)^T}$ $dB'_{rc} = dB_{rc} + (dB_c - dB_{rc}) * e_{N \times N}^{(n,n)^T}$ Case 2: $\{r', c'\} \equiv \{r, c'_m\}$ $dB(m,:) \leftrightarrows dB_c(m,:)$ $dB' = dB + e_{M \times M}^{(m,m)^T} * (dB_c - dB)$ $dB'_c = dB_c + e_{M \times M}^{(m,m)^T} * (dB - dB_c)$ $dB_r(m,:) \leftrightarrows dB_{rc}(m,:)$ $dB'_r = dB_r + e_{M \times M}^{(m,m)^T} * (dB_{rc} - dB_r)$ $dB'_{rc} = dB_{rc} + e_{M \times}^{(m)^T} * (dB_r - dB_{rc})$ Case 3: $\{r', c'\} \equiv \{r'_n, c'_m\}$ simultaneously: $dB(:,n) \leftrightarrows dB_r(:,n), dB(m,:) \leftrightarrows dB_c(m,:), dB_r(m,:)$ $\leftrightarrows dB_{rc}(m,:), dB_c(:,n) \leftrightarrows dB_{rc}(:,n), dB(m,n)$ $\leftrightarrows dB_{rc}(m,n)$, and $dB_c(m,n) \leftrightarrows dB_c(m,n)$ $dB' = dB + e_{M \times M}^{(m,m)}(dB_c - dB) + (dB_r - dB)e_{N \times N}^{(n,n)} + e_{M \times M}^{(m,m)}(dB_{rc} - dB_r - dB_c + dB)e_{N \times N}^{(n,n)}$ $dB'_r = dB_r + e_{M \times M}^{(m,m)}(dB_{rc} - dB_r) + (dB - dB_r)e_{N \times N}^{(n,n)} + e_{M \times M}^{(m,m)}(dB_c - dB - dB_{rc} + dB_r)e_{N \times N}^{(n,n)}$ $dB'_c = dB_c + e_{M \times M}^{(m,m)}(dB - dB_c) + (dB_{rc} - dB_c)e_{N \times N}^{(n,n)} + e_{M \times M}^{(m,m)}(dB_r - dB - dB_{rc} + dB_c)e_{N \times N}^{(n,n)}$ $dB'_{rc} = dB_{rc} + e_{M \times M}^{(m,m)}(dB_r - dB_{rc}) + (dB_c - dB_{rc})e_{N \times N}^{(n,n)} + e_{M \times M}^{(m,m)}(dB - dB_r - dB_c + dB_{rc})e_{N \times N}^{(n,n)}$ The update for $\{d, d_r(n), d_c(m), d_{rc}(n, m)\}$ in step 4 of the method for finding $\arg\min_{\{r',c'\} \in N_{\{r,c\}}} \Delta(r', c', w)$ is as follows:

Case 1

$d' = d_r e_N^{(n)}$ $d' = d_r(n)$ $d'_r = d_r + (d' - d)\left(1_N^T - 2e_N^{(n)^T}\right)$ $d'_r(j) = \begin{cases} d_r(j) + d_r(n) - d & \text{for } j \neq n \\ d & \text{for } j = n \end{cases}$ $d'_c = d_{rc} e_N^{(n)}$ $d'_c(i) = d_{rc}(i, n)$ $d'_{rc} = d_{rc} + d_{rc}(e_N^{(n)} 1_N^T - 2e_{N \times N}^{(n,n)}) - d_c\left(1_N^T - 2e_N^{(n)^T}\right) =$ $d_{rc} + (d'_c - d_c)\left(1_N^T - 2e_N^{(n)^T}\right)$ $d'_{rc}(i, j) = \begin{cases} d_{rc}(i, j) + d_{rc}(i, n) - d_c(i) & \text{for } j \neq n \\ d_c(i) & \text{for } j = n \end{cases}$ Case 2

$d' = e_M^{(m)^T} d_c$ $d' = d_c(m)$ $d'_r = e_M^{(m)^T} d_{rc}$ $d'_r(j) = d_{rc}(m, j)$ $d'_c = d_c + (1_M - 2e_M^{(m)})(d' - d)$ $d'_c(i) = \begin{cases} d_c(i) + d_c(m) - d & \text{for } i \neq m \\ d & \text{for } i = m \end{cases}$ $d'_{rc} = d_{rc} + \left(e_M^{(m)^T} 1_M - 2e_{M \times M}^{(m,m)}\right) d_{rc} - (1_M - 2e_M^{(m)}) d_r =$ $d_{rc} + (1_M - 2e_M^{(m)})(d'_r - d_r)$ $d'_{rc}(i, j) = \begin{cases} d_{rc}(i, j) + d_{rc}(m, j) - d_r(j) & \text{for } i \neq m \\ d_r(j) & \text{for } i = m \end{cases}$ -continued $$d' = e_M^{(m)T} d_{rc} e_N^{(n)} \quad \text{Case 3}$$

$$d' = d_{rc}(m, n)$$

$$d'_r = e_M^{(m)T} d_{rc} + \left(d' - e_M^{(m)T} d_c\right)\left(1_N^T - 2e_N^{(n)T}\right)$$

$$d'_r(j) = \begin{cases} d_{rc}(m, j) + d_{rc}(m, n) - d_c(m) & \text{for } j \neq n \\ d_c(m) & \text{for } j = n \end{cases}$$

$$d'_c = d_{rc} e_N^{(n)} + (1_M - 2e_M^{(m)})(d' - d_r e_N^{(n)})$$

$$d'_c(i) = \begin{cases} d_{rc}(i, n) + d_{rc}(m, n) - d_r(n) & \text{for } i \neq m \\ d_r(n) & \text{for } i = m \end{cases}$$

$$d'_{rc} = d_{rc} + (1_M - 2e_M^{(m)})(d'_r - d_r) +$$
$$(d'_c - d_c)\left(1_N^T - 2e_N^{(n)T}\right) - (1_M - 2e_M^{(m)})(d' - d)1_N -$$
$$1_M(d' - d)\left(1_N^T - 2e_N^{(n)T}\right) + 1_M(d' - d)1_N^T$$

$$d'_{rc}(i, j) =$$
$$\begin{cases} d_{rc}(i, j) + d_{rc}(m, j) - d_r(j) + d_{rc}(i, n) - d_c(i) + d_{rc}(m, n) \\ \quad - d_r(n) - d_c(m) + d & \text{for } i \neq m, j \neq n \\ d_r(n) + d_r(j) - d & \text{for } i = m, j = n \\ d_c(m) + d_c(i) - d & \text{for } i \neq m, j = n \\ d & \text{for } i = m, j = n \end{cases}$$

Figure 8:
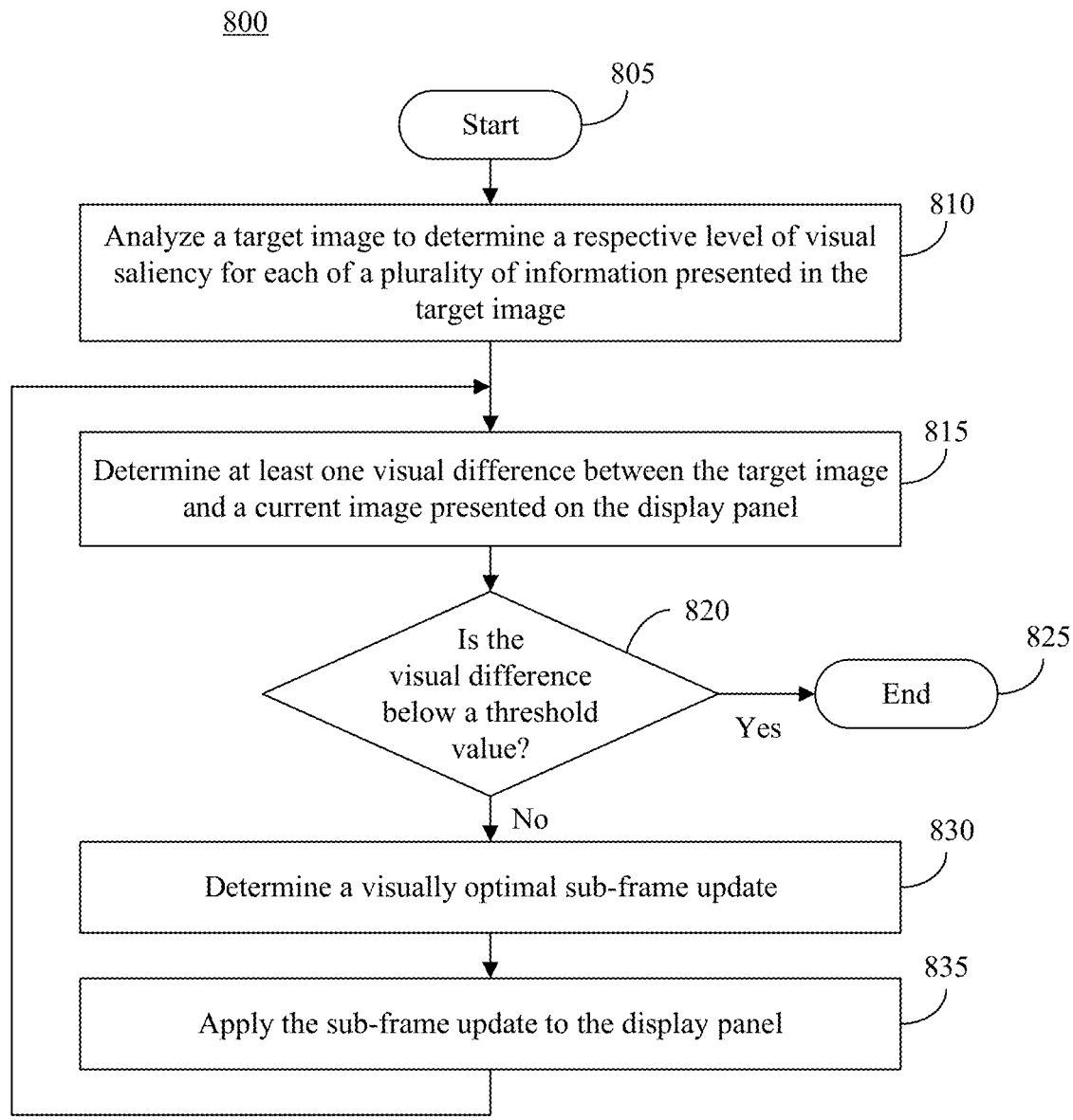
FIG. 8 is a flow chart illustrating an example of a method of computing an update to excite pixels in a display panel.

FIG. 8 is a flow chart illustrating an example of a method 800 of computing an update to excite pixels in a display panel. The method 800 can be automatically implemented by the display driver 250 of FIG. 2. In another arrangement, the method 800 can be implemented by software running on the host processor 105 of FIG. 1 that computes the updates to be sent to display driver 250.

The method 800 can begin at step 805. At step 810, a target image can be analyzed to determine a respective level of visual saliency for each of a plurality of visual elements presented in the target image. For example, information depicted in the target image, or at least one visual feature of the information depicted in the target image, that is distinctive can be determined. A visual saliency value indicating a level of importance (or prominence) of the visual elements, or a level of importance (or prominence) of the at least one visual feature of the visual elements, can be assigned to the determined information. In another example, information depicted in the target image, or at least one visual feature of the information depicted in the target image, that satisfies user specified preferences can be determined. A visual saliency value indicating a level of correlation of the information with the user specified preferences, or a level of correlation of the at least one visual feature of the information with the user specified preferences, can be assigned to the determined information. Note that it is also possible to use a null visual salience metric that assigns equal value to all parts or pixels of the image to be displayed. Measures of visual salience can be used to prioritize the order of updates sent to the display. Accordingly, the most salient features of the target image can be displayed earlier in a sequence of subframes that appear on the display.

At step 815, at least one visual difference between the target image and a current image presented on a display panel can be determined. For example, the difference between the target image and the current image can be analyzed and a value can be assigned to indicate a level of the difference. At decision box 820, a determination can be made as to whether the visual difference is below a threshold value. If so, the process can end at step 825.

If the visual difference is not below the threshold value, at step 830, a visually optimal sub-frame update for the display panel can be determined. At step 835, the sub-frame update can be applied to the display panel. Applying the sub-frame update can include, for example, driving a plurality of rows of the display panel simultaneously with driving a plurality of columns of the display panel, wherein driving the plurality of rows of the display panel simultaneously with driving the plurality of columns of the display panel activates pixels at intersections of respective rows and respective columns of the display panel.

The process then can return to step 815 and steps 815-835 can be iterated until the visual difference is determined to be below the threshold value at decision box 820. In illustration, during a first iteration, the sub-frame update can provide at least a partial rendering of at least one portion of the target image on the display panel. The partial rendering of that portion or portions of the target image can provide the information presented in the target image that is determined to have a highest level of visual saliency from among a plurality of portions of information presented in the target image. Successive iterations can continue to provide sub-frame updates to the display panel until a visual difference between the determined portion of the target image and an image currently presented on the display panel is below a threshold value.

Next, one or more visually optimal sub-frame updates can be determined for another portion or portions of the target image having a next highest level of saliency, and those sub-frame updates can be applied to the display panel until a visual difference between the other portion of the target image and an image currently presented on the display panel is below a threshold value. The process can iterate until the visual difference between the entire target image and the image currently presented on the display panel is below the threshold value. At that point, the current image presented on the display panel will be the target image. In some instances, a later sub-frame update for the display panel can deactivate a portion of the pixels activated by an earlier sub-frame update.

Figure 9:
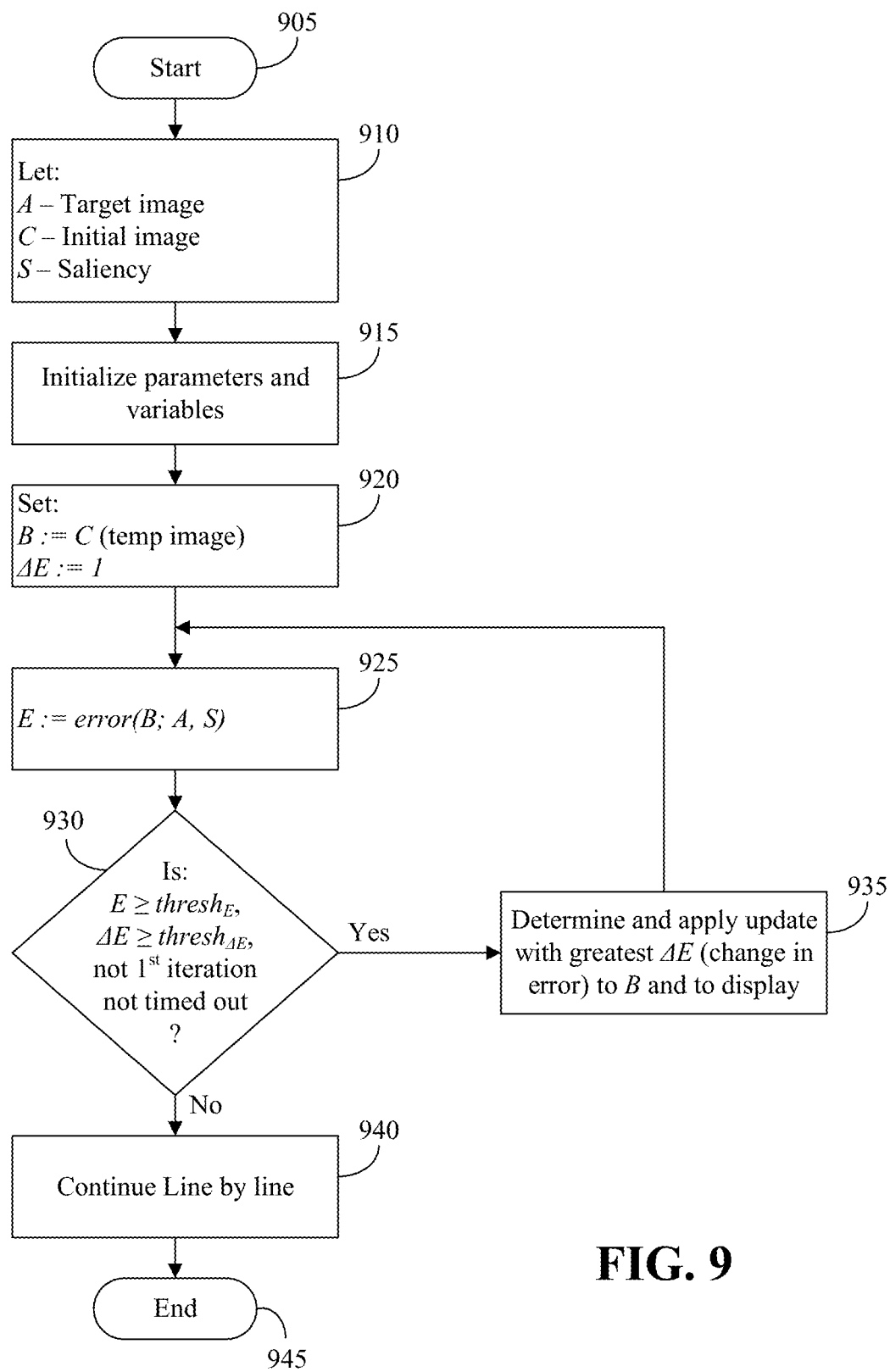
FIG. 9 is a flow chart illustrating another example of a method of computing an update to excite pixels in a display panel.

FIG. 9 is a flow chart illustrating another example of a method 900 of computing an update to excite pixels in a display panel. The method 900 can be automatically implemented by the display driver 250 of FIG. 2 or in software on the host processor 105 of FIG. 1, as described previously.

The method can begin at step 905. At step 910, a constant A can be assigned to a target image, a variable C can be assigned to an initial image presented on a display panel (e.g., all white, all black, or the previously displayed image), and a variable S can be assigned to represent respective saliencies of various portions of the target image. At step 915, parameters and variables of the update computation algorithm can be initialized. At step 920, a variable B can be assigned as a temporary image and set to be equal to the variable C, and a variable ΔE (change in error) can be set to be 1. At step 925, a variable E can be assigned to be an error value for B, given A and S. The variable E is a measurement of error of the temporary image B given the target image G and the salience metric S.

At decision box 930, a determination can be made whether the error E is equal to or greater than a first threshold value, whether the variable ΔE is equal to or greater than a second threshold value, whether the process currently is not during a first iteration of computing pixel updates, and whether a timer has not timed out. If each of these conditions are true, the process can proceed to step 935. At step 935, an update to a sub-frame of the target image with a greatest level of ΔE (change in error) can be determined and sent to the display driver to excite the rows and columns as specified by the sub-frame update, and the process can return to step 925.

If, at decision box 930, any of the conditions are not true, the process can continue to step 940, and updates can be computed on a line-by-line (e.g., row-by-row or column-by-column) basis. At step 945 the process can end.

At this point it should be noted that the method 900 can be a top-level method of the update computation process, where step 935 can be a place holder for any of the processes described in the following FIGS. 10, 11 and 12.

Figure 10:
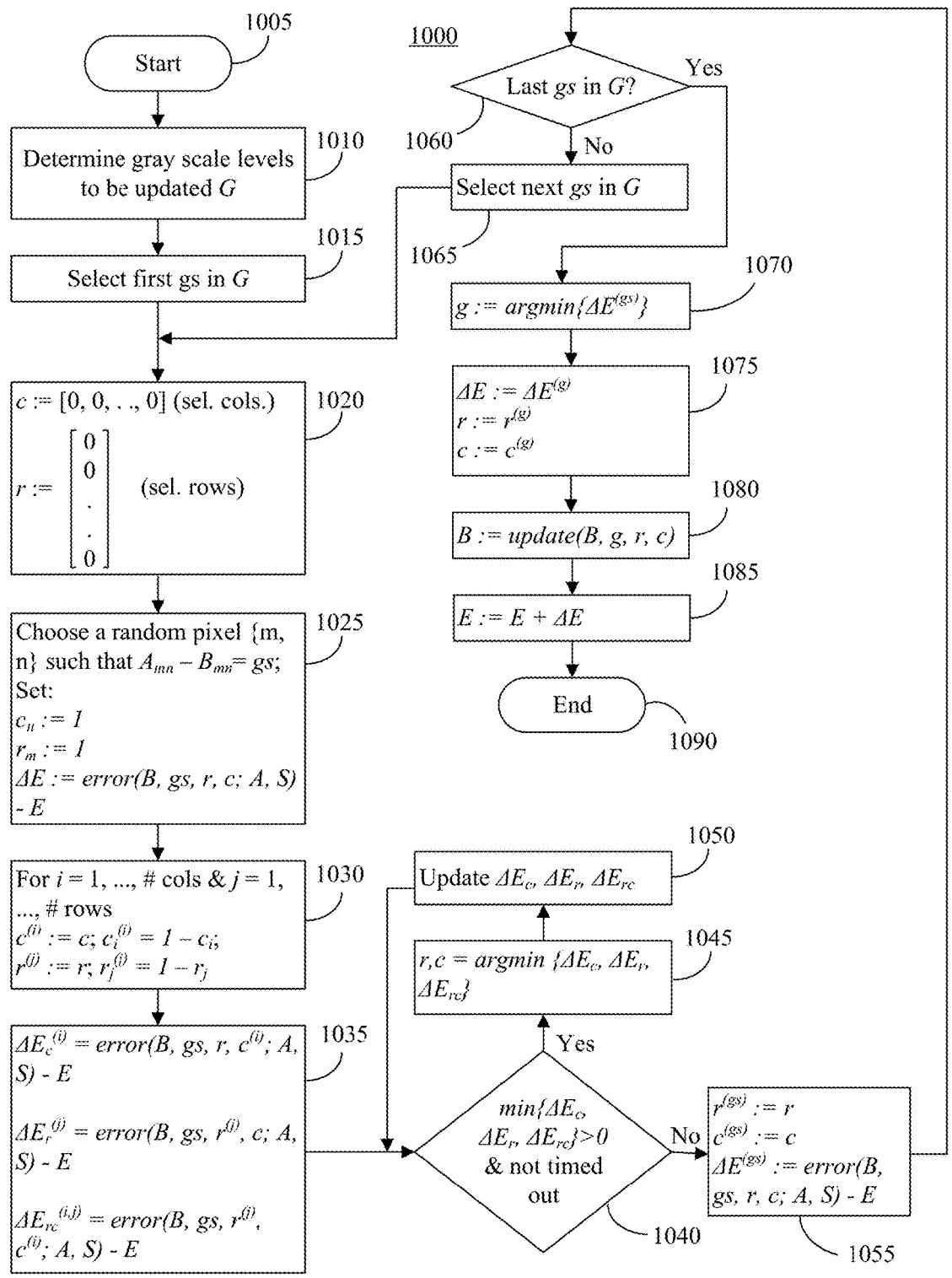
FIG. 10 is a flow chart illustrating an example of a method of determining a visually optimal sub-frame of an image.

FIG. 10 is a flow chart illustrating an example of a method 1000 of determining a visually optimal sub-frame of an image. The method 1000 can be implemented at step 935 of the method 900 of FIG. 9. The method 1000 can be automatically implemented by the display driver 250 of FIG. 2 or in software on the host processor 105 of FIG. 1, as described previously. The method 1000 can implement a greedy local neighbor search (GLNS) process to find a best sub-frame update in the form of gray scale level (gs) and Boolean vectors (r, c) corresponding to selected rows (r) and columns (c).

The method 1000 can begin at step 1005. At step 1010, gray scale levels to be updated (G) can be determined. At step 1015, a first gray scale update (gs) in G can be selected.

At step 1020 row and column selection vectors can be determined for the sub-frame for which the gray scale update (gs) is to be computed. The vectors determine the columns and rows to be selected for an update in the sub-frame. At step 1025, a random pixel {m, n} in the sub-frame can be chosen subject to the constraint $A_{mn}-B_{mn}=gs$, where $A_{mn}$ is the target gray scale value of the determined pixel in the target image and $B_{mn}$ is the gray scale value of the current state of the determined pixel. The corresponding elements $c_n$ of the column selection vector and $r_m$ of the row selection vector for the determined pixel each can be set to be equal to 1 to indicate this selection. Further, a variable JE can be determined where $\Delta E$:=error(B, gs, r, c; A, S)–E. $\Delta E$ represents a change in an error, from a previous error E, if the temporary image B were updated at row r and column c to the gray scale value gs given the target image A and salience metric S.

At step 1030, for i=1, . . . , # of columns and j=1, . . . , # of rows, the following values can be set: $c^{(i)}$:=c; $c_j^{(i)}$=1−$c_i$; $r^{(j)}$:=r; and $r_j^{(j)}$=1−$r_j$. At step 1035, the following values can be set: $\Delta E_c^{(i)}$=error(B, gs, r, $c^{(i)}$; A, S)–E; $\Delta E_r^{(j)}$=error(B, gs, $r^{(j)}$c; A, S)–E; and $\Delta E_{rc}^{(i,j)}$=error(B, gs,) $r^{(j)}$, $c^{(i)}$; A, S)–E. Again, the variables $\Delta E_x^{(x)}$ can represent changes in errors, from previous errors E, if the temporary image B were updated at row r and column c to the gray scale value gs given the target image A and salience metric S.

Referring to decision box 1040, a determination can be made as to whether min{$\Delta E_c$, $\Delta E_r$, $\Delta E_{rc}$}>0 and a timer has not timed out. If so, the process can proceed to step 1045 where r,c=argmin{$\Delta E_c$, $\Delta E_r$, $\Delta E_{rc}$} is set. Argmin{$\Delta E_c$, $\Delta E_r$, $\Delta E_{rc}$} provides the minimum change in error among $\Delta E_c$, $\Delta E_r$, $\Delta E_{rc}$, and the current values for r, c can be updated to those row and column selection vectors which cause the most negative change in error. At step 1050, $\Delta E_c$, $\Delta E_r$, $\Delta E_{rc}$ can be updated. In this regard, $\Delta E_c$, $\Delta E_r$, $\Delta E_{rc}$ can be updated in response to r,c being updated in a very efficient manner by modifying values from one column/row to another instead of repeating steps 1030, 1035 to update $\Delta E_c$, $\Delta E_r$, $\Delta E_{rc}$ for the presently selected gs. This efficient method is described above with regard to Case 1:{r', c'}≡{r'$_n$, c}, Case 2:{r', c'}≡{r, c'$_m$} and Case 3:{r', c'}≡{r'$_n$, c'$_m$}. Thus, for each gs, steps 1030, 1035 need only be performed once, while steps 1045, 1050 can be performed reiteratively to provide subsequent updates for $\Delta E_c$, $\Delta E_r$, $\Delta E_{rc}$.

The process then can return to decision box 1035 and reiterate until min{$\Delta E_c$, $\Delta E_r$, $\Delta E_{rc}$}≤0 or a timer has timed out. Responsive to min{$\Delta E_c$, $\Delta E_r$, $\Delta E_{rc}$}≤0 or the timer timing out, the process can proceed to step 1055. At step 1055, the following values can be set: $r^{(gs)}$:=r; $c^{(gs)}$:=c; and $\Delta E^{(gs)}$:=error(B, gs, r, c; A, S)–E.

At decision box 1060, a determination can be made whether the presently selected gray scale update gs is the last gray scale update gs in G. If not, at step 1065 a next gray scale update gs in G can be selected, and the process can return to step 1020.

Referring again to decision box 1060, if a determination is made that the presently selected gray scale update gs is the last gray scale update gs in G, the process can proceed to step 1070. At step 1070, g:=argmin{$\Delta E^{(gs)}$} can be set. In this regard, the gray scale update g with the smallest error can be selected from the set of candidate updates. At step 1075, the following values can be set: $\Delta E$:=$\Delta E^{(g)}$; r:=$r^{(g)}$; and c:=$c^{(g)}$. Here, g can be a scalar gray level, r can be a column vector, and c can be a row vector. At step 1080, the temporary image B can be updated by setting the image B as follows: B:=update(B, g, r, c), which can be computed as B−g*r*c. The product (g*r*c) can be a sparse matrix with the value g where pixels are to be updated, and update values can be set to other pixels to ignore such pixels during the update. At step 1085, the error E can be updated as follows: E:=E+$\Delta E$. At step 1090, the process can end.

Figure 11A:
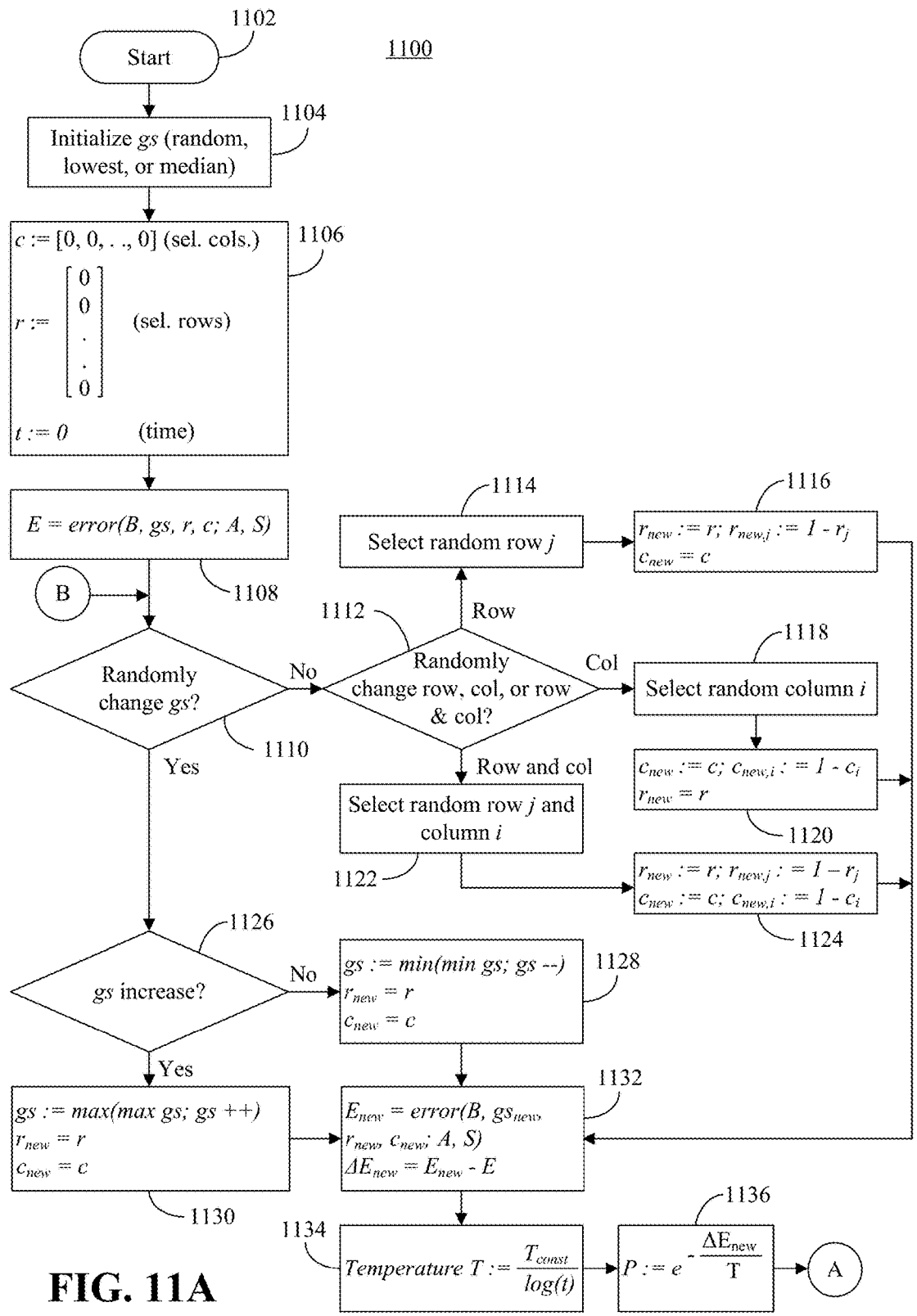
FIGS. 11A and 11B are a flow chart illustrating an example of a method of performing a simulated annealing process for an image.
Figure 11B:
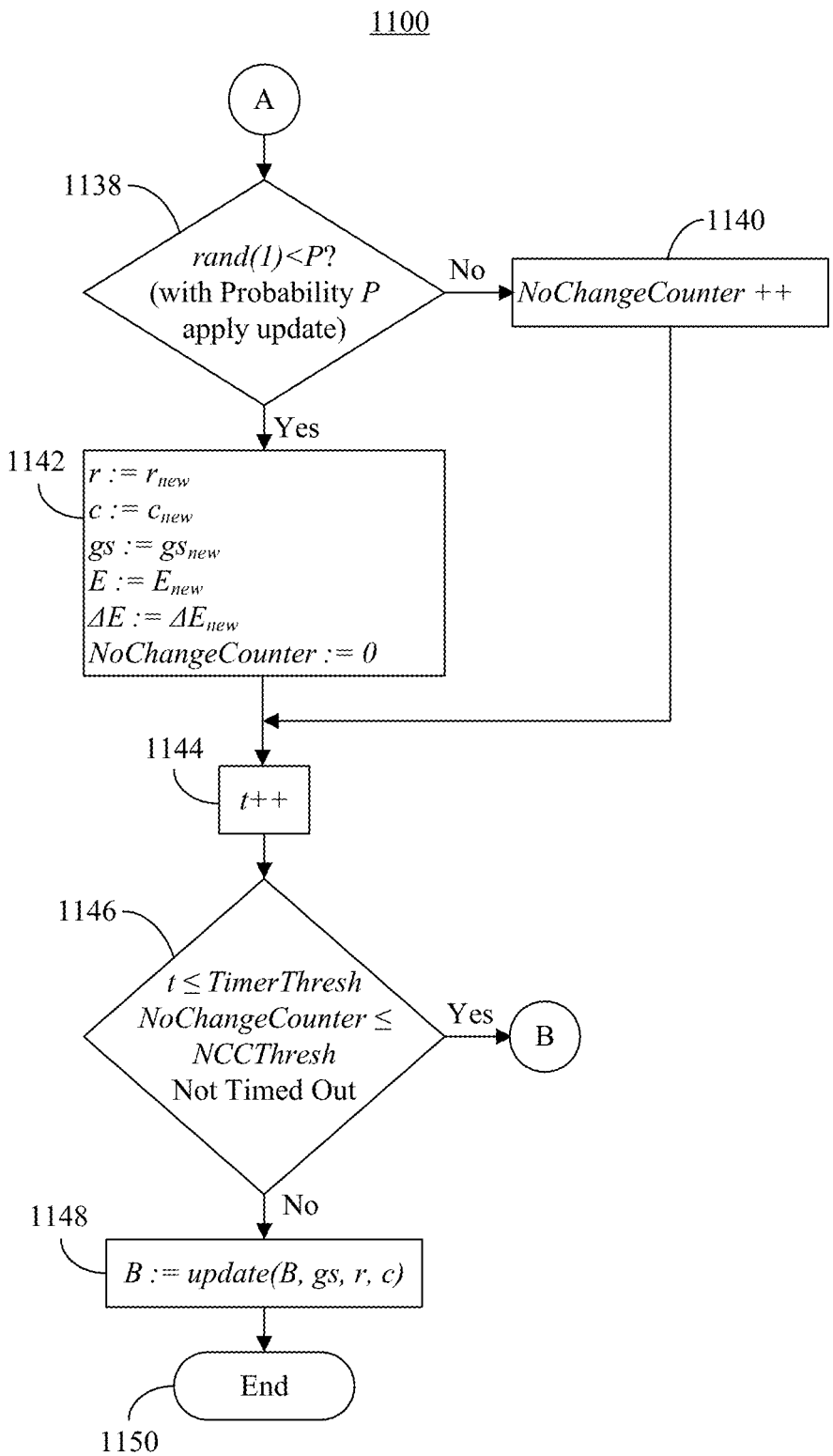

FIGS. 11A and 11B are a flow chart illustrating an example of a method 1100 of performing a simulated annealing process for an image. The method 1100 can be implemented at step 935 of the method 900 of FIG. 9. The method 1100 can be automatically implemented by the display driver 250 of FIG. 2 or in software on the host processor 105 of FIG. 1, as described previously.

Referring to FIG. 11A, the method 1100 can begin at step 1102. At step 1104 a gray scale update gs can be initialized. For example, a random gray scale update, a lowest gray scale update or a median gray scale update can be initialized. In illustration, the elements of the matrix gs can be initialized to uniformly distributed random gray scale values, a minimum of all gray scale values in the target image, or a median of all gray scale values in the target image. At step 1106 a matrix can be determined for the sub-frame for which the gray scale update is determined. The matrix can include each of the columns and rows in the sub-frame. In addition, a timer t can be set to t:=0. At step 1108, an Error E can be set as follows: E=error(B, gs, r, c; A, S). At decision box 1110, a determination can be made as to whether to randomly select to change gs.

If no gs change is selected, at decision box 1112 a determination can be made to randomly change a row, a column or both a row and a column. If at decision box 1112 the determination is to randomly change a row, at step 1114 a random row j can be selected. At step 1116 the following values can be set: $r_{new}$:=r; $r_{new,j}$:=1−$r_j$; and $c_{new}$=c. If at decision box 1112 the determination is to randomly change a column, at step 1118 a random column i can be selected and at step 1120 the following values can be set: $c_{new}$:=c; $c_{new,i}$:=1−$c_i$; and $r_{new}$:=r. If at decision box 1112 the determination is to randomly change a row and column, at step 1122 a random row j and a random column i can be selected, and step 1124 the following values can be set: $r_{new}$:=r; $r_{new,j}$:=1−$r_j$; $c_{new}$:=c; and $c_{new,i}$:=1−$c_i$. The process then can proceed to step 1132.

Referring again to decision box 1110, if a determination is made to change gs, at decision box 1126 a determination can be made whether to increase gs (e.g., randomly). If not, at step 1128 the following values can be set: gs:=min(min gs; gs--); $r_{new}$:=r; and $c_{new}$:=c. The process then can proceed to step 1132. If, however, a determination is made to increase gs, at step 1130 the following values can be set: gs:=max (max gs; gs++); $r_{new}$:=r; and $c_{new}$:=c. The process then can proceed to step 1132.

At step 1132, the following values can be set: $E_{new}$=error (B, $r_{new}$, $c_{new}$, $gs_{new}$; A, S); and $\Delta E_{new}$=$E_{new}$-E. At step 1134, a temperature T value can be set as follows:

$$T := \frac{T_{const}}{\log(t)}.$$

At step 1136, a probability P value can be set as follows:

$$P := e^{-\frac{\Delta E_{new}}{T}}.$$

The process then can proceed to decision box 1138 of FIG. 11B.

At decision box 1138, a determination can be made as to whether the probability P is greater than a random probability rand(1). If not, at step 1140 a counter NoChangeCounter can be incremented, and the process can proceed to step 1144. If, however, the probability P is greater than the random probability rand(1), at step 1142 the following values can be set: r:=$r_{new}$; c:=$c_{new}$; gs:=$gs_{new}$; E:=$E_{new}$; $\Delta E$:=$\Delta E_{new}$; and NoChangeCounter:=0. At step 1144, the time t can be incremented.

Referring to decision box 1146, if the time t is less than or equal to a timer threshold value, the NoChangeCounter is less than a NoChangeCounter threshold value and the timer has not timed out, the process can return to decision box 1110 of FIG. 11A. Otherwise, the process can proceed to step 1148 and B can be updated with (gs, r, c). At step 1150 the process can end.

Figure 12:
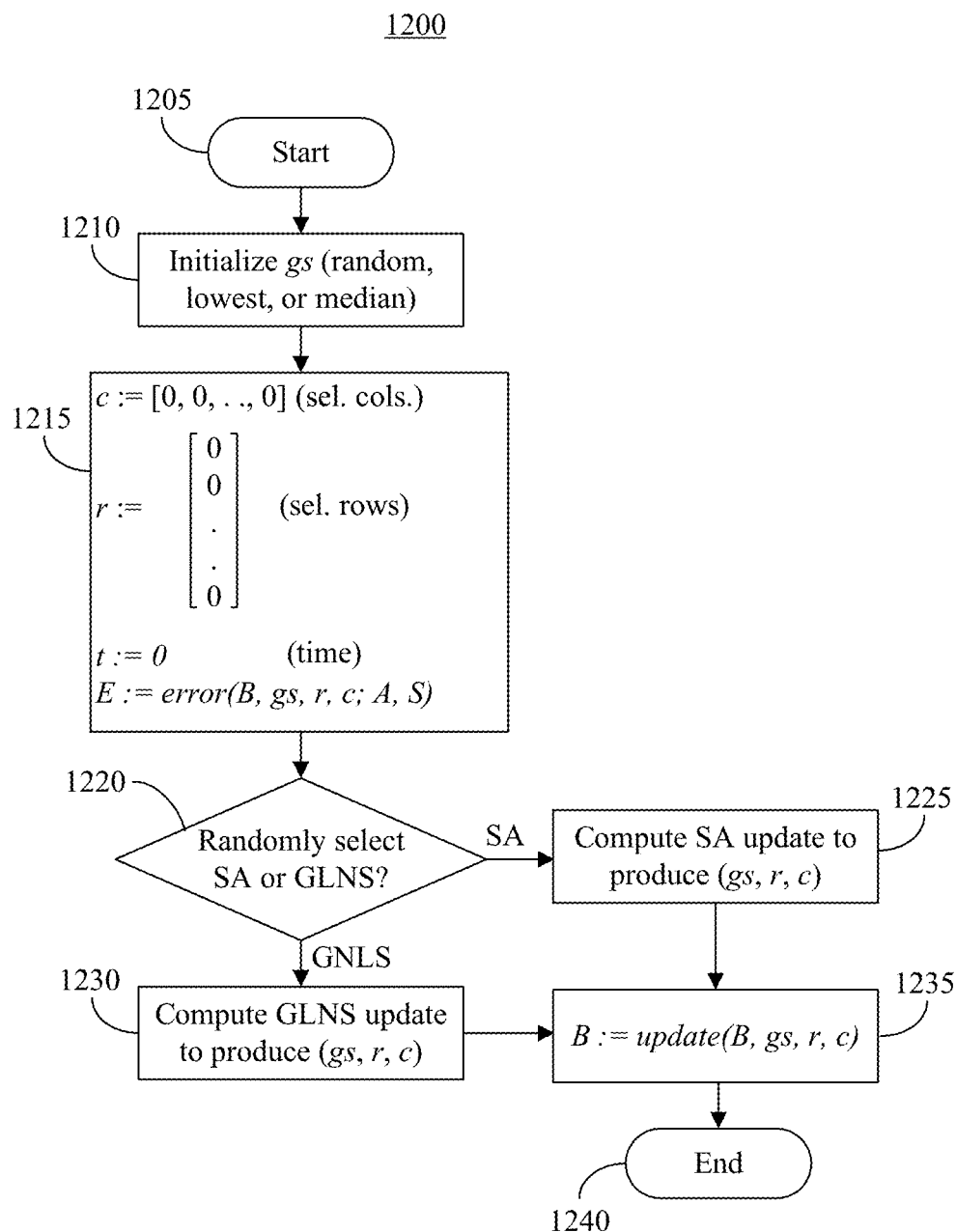
FIG. 12 is a flow chart illustrating an example of a method of determining a sub-frame update for an image and performing a simulated annealing process for the image.

FIG. 12 is a flow chart illustrating an example of a method 1200 of determining a sub-frame update for an image and performing a simulated annealing process for the image. The method 1200 can be implemented at step 935 of the method 900 of FIG. 9. The method 1200 can be automatically implemented by the display driver 250 of FIG. 2 or in software on the host processor 105 of FIG. 1, as described previously.

The method 1200 can begin at step 1205. At step 1210 a gray scale update gs can be initialized. For example, a random gray scale update, a lowest gray scale update or a median gray scale update can be initialized. In illustration, the elements of the matrix gs can be initialized to uniformly distributed random gray scale values, a minimum of all gray scale values in the target image, or a median of all gray scale values in the target image. At step 1215 a matrix can be determined for the sub-frame for which the gray scale update is determined. The matrix can include each of the columns and rows in the sub-frame. In addition, a timer t can be set to t:=0 and an Error E can be set as follows: E=error(B, gs, r, c; A, S).

At decision box 1220, a determination can be made as to whether to randomly select the GLNS process (method 1000) of FIG. 10 or the simulated annealing (SA) process (method 1100) of FIGS. 11A and 11B. If the simulated annealing process is selected, at step 1225 the simulated annealing process can be used to compute a simulated annealing update to produce the gray scale value gs and the row and column r, c selection vectors to be updated. If the GLNS process is selected, at step 1230 the GLNS process can be used to compute a GNLS update to produce the gray scale value gs and the row and column r, c selection vectors to be updated. Regardless of which process is selected, the process can proceed to step 1235 and B can be updated with B:=update(B, gs, r, c). At step 1240 the process can end.

While the methods 1000, 1100, 1200 of FIGS. 10-12 discuss gray scales, the methods 1000, 1100, 1200 can be implemented on color images to activate color pixels (e.g., red, green and blue pixels) and set their color levels in a straight forward manner. For example, the algorithms presented herein can be extended to color images by processing the color channels (e.g., red, green and blue) independently in the same manner as a gray scale channel.

In various experiments, the GLNS algorithm was implemented using modelling software and tested on random generated images, images composed of patterns of repeated random generated patches, low resolution black-and-white real images, and several real images with varying resolution and gray scale depth. The random images varied in size from [4, 6] to [18, 30] and each pixel was a binary random variable, as follows:

$$A = [A_{m,n}]_{m,n=1}^{M,N}$$

where $A_{m,n}$ are binary random variables $$\{M,N\} \in \{\{4,6\}, \{6,10\}, \{8,12\}, \{10,18\}, \{18,30\}\}$$

The rank R of the pixel matrices for the test images was on average the smallest dimension. Since any decomposition of A requires R independent elements, an optimum solution for the number of updates an algorithm used to produce an image A is assumed to be on average approximately R. Hence, an algorithm was deemed successful if it produces a solution {r, c, w} with number of updates, K, very close to R, for the GLNS algorithm E[K]≈2R.

FIGS. 13A and 13B depict an example target image 1300 in which pixels in a sub-frame of the target image 1300 are prioritized when rendering the target image 1300. In this example, a saliency value can be assigned to various sub-frames 1305, 1310, 1315 in the target image 1300. Because the sub-frame 1305 includes text, that sub-frame 1305 can be assigned the highest saliency value from among the saliency values assigned to the various sub-frames 1305, 1310, 1315. Accordingly, the sub-frame 1305 can be assigned highest priority when applying updates to the display. As a result, the sub-frame 1305 can be rendered much more quickly than if the entire image 1300 were simultaneously rendered on a row by row or column by column basis. For example, the sub-frame 1305 can be rendered in one-tenth of the amount of time it would take to render the entire image 1300 on a row by row or column by column basis.

FIGS. 14A-14F depict an example of various stages of rendering an image 1405 in accordance with the arrangements described herein. FIG. 14A represents reconstruction of the image 1405 by the $3^{rd}$ sub-frame update, FIG. 14B represents reconstruction of the image 1405 by the $10^{th}$ sub-frame update, FIG. 14C represents reconstruction of the image 1405 by the $50^{th}$ sub-frame update, FIG. 14D represents reconstruction of the image 1405 by the $100^{th}$ sub-frame update, FIG. 14E represents reconstruction of the image 1405 by the $500^{th}$ sub-frame update, and FIG. 14F represents reconstruction of the image 1405 by the final sub-frame update. Advantageously, the image 1405 can come more into focus with each of the sub-frame updates.

Figure 15A:
FIGS. 15A and 15B depict another example of various stages of rendering an image in accordance with the arrangements described herein.
Figure 15B:

A purely random image can be very difficult for the human visual system to process adequately, since there is no underlying information, nor any familiar patterns or objects for the human brain to perceive. A random pattern is barely distinguishable from its neighboring patterns. FIGS. 15A and 15B illustrate this point by comparing the image 1505 at the 18$^{th}$ sub-frame of a GLNS solution (FIG. 15A) with final version of the image 1505 produced at the 36$^{th}$ sub-frame (FIG. 15B). During testing, the GLNS solution produced the final version of the image 1505 very quickly, and the final version of the image 1505 visually is very similar to the target random image.

The repeated random patches include a random binary matrix of size between [4,6] and [18,30] repeated in both directions 2 to 5 times as follows:

$$A_{(r)}[A_{m,n}]_{m,n=1}^{M_{(r)},N_{(r)}} \text{ where } A_{m,n} \text{ are binary random variables}$$

$$\{M_{(r)}, N_{(r)}\} \in \{\{4, 6\}, \{6, 10\}, \{8, 12\}, \{10, 18\}, \{18, 30\}\}$$

$$A = \begin{bmatrix} A_{(r)} & \cdots & A_{(r)} \\ \vdots & \ddots & \vdots \\ A_{(r)} & \cdots & A_{(r)} \end{bmatrix} \text{ with size } (A) = \{M, N\} \equiv \{rM_{(r)}, rN_{(r)}\}$$

for $r = 2 \ldots 5$

The resulting rank of the pixel matrix has the rank R of the repeated patch. The GLNS algorithm is able to pick out the underlying pattern, and the algorithm returned [K]≈2R≈E [K$_{(r)}$], where K$_{(r)}$ is the number of updates GLNS finds in the repeated patch.

Figure 16A:
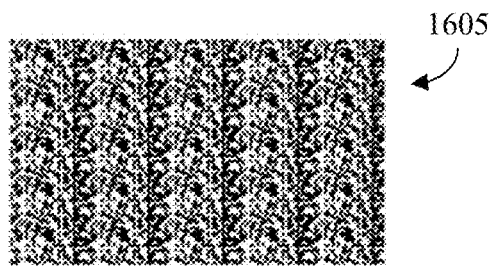
FIGS. 16A and 16B depict another example of various stages of rendering an image in accordance with the arrangements described herein.
Figure 16B:
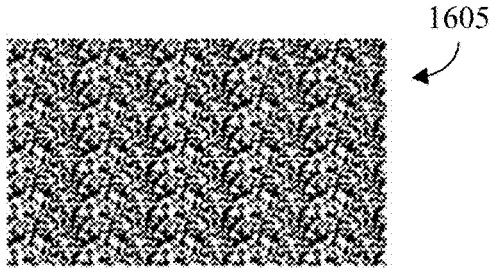

The GLNS algorithm also is successful in finding the pattern of a pure random image, and produces very quickly a visually similar image, for example as depicted in FIGS. 16A and 16B. In this example, FIG. 16A represents reconstruction of the random image 1605 by the 15$^{th}$ frame, and FIG. 16B represents reconstruction of the random image 1605 by the 40$^{th}$ frame.

In this example, the random image 1605 has no relevant information for the human brain: images in real world applications very seldom contain pure random noise since the image of a display in practical applications should relay some information to a human user. Nonetheless, this example is useful for understanding the advantages of the GLNS algorithm.

The GLNS algorithm also was tested on various black-and-white images, created as a show case of a model of the slow liquid crystal display. The images represent a sample of real world scenarios the display panel and the GLNS algorithm. The size of the images tested was [216, 424]. Testing showed that a serial update algorithm displays the full image in 216 frames, whereas the GLNS algorithm displayed human recognizable information using significantly fewer frames. For instance, when reconstructing images, the GLNS algorithm typically is able to produce visually acceptable result within 100 sub-frames, but can refine the details thereafter.

FIGS. 17A-17D depict another example of various stages of rendering an image 1705 in accordance with the arrangements described herein. In this example, the image 1705 does not have dither. FIG. 17A represents reconstruction of the image 1705 by the 10$^{th}$ sub-frame update, FIG. 17B represents reconstruction of the image 1705 by the 50$^{th}$ sub-frame update, FIG. 17C represents reconstruction of the image 1705 by the 70$^{th}$ sub-frame update, and FIG. 17D represents reconstruction of the image 1705 by the 99$^{th}$ sub-frame update. By the 50$^{th}$ sub-frame update, most of the information presented in the image 1705 is clearly shown, and by the 70$^{th}$ sub-frame update the information is even more clear. By the 99$^{th}$ sub-frame update, rendering of the image is complete, or nearly complete.

FIGS. 18A-18D depict another example of various stages of rendering an image 1805 in accordance with the arrangements described herein. In this example, the image 1605 also does not have dither but, in comparison to the image 1605 of FIGS. 16A 16D, includes more details. FIG. 18A represents reconstruction of the image 1805 by the 10$^{th}$ sub-frame update, FIG. 18B represents reconstruction of the image 1805 by the 50$^{th}$ sub-frame update, FIG. 18C represents reconstruction of the image 1805 by the 100$^{th}$ sub-frame update, and FIG. 18D represents reconstruction of the image 1805 by the 205$^{th}$ sub-frame update. By the 100$^{th}$ sub-frame update, most of the information presented in the image 1805 is understandable, and by the 205$^{th}$ sub-frame update the information is even more clear.

FIGS. 19A and 19B depict another example of various stages of rendering an image 1905 in accordance with the arrangements described herein. FIG. 19A represents reconstruction of the image 1905 by the 30$^{th}$ sub-frame update and FIG. 19B represents reconstruction of the image 1905 by the 100$^{th}$ sub-frame update. By the 30$^{th}$ sub-frame update, information presented in the image 1905 is understandable, and by the 100$^{th}$ sub-frame update the image is very clear.

FIGS. 20A and 20B depict another example of various stages of rendering an image 2005 in accordance with the arrangements described herein. FIG. 20A represents reconstruction of the image 2005 by the 30$^{th}$ sub-frame update and FIG. 20B represents reconstruction of the image 2005 by the 100$^{th}$ sub-frame update. By the 30$^{th}$ sub-frame update, information presented in the image 2005 is understandable, and by the 100$^{th}$ sub-frame update the image is very clear.

FIGS. 21A and 21B depict another example of various stages of rendering an image 2105 in accordance with the arrangements described herein. FIG. 21A represents reconstruction of the image 2105 by the 30$^{th}$ sub-frame update and FIG. 21B represents reconstruction of the image 2105 by the 100$^{th}$ sub-frame update. By the 30$^{th}$ sub-frame update, information presented in the image 2105 is understandable, and by the 100$^{th}$ sub-frame update the image is very clear.

In addition to the previously described GLNS and simulated annealing processes, various other approaches to rendering images in accordance with the present arrangements may be used.

For example, non-negative matrix factorization (NMF or NNMF) algorithms can be used to process a target image to be rendered. For example, NMF or NNMF algorithms can be used to construct approximate factorizations of the form V≈WH where the image (given as an n×m matrix V) is factored into matrices W and H (with dimensions n×r and r×m, where r is the rank of factorization) and subject to the constraints W, H≥0. In this regard, NMF can be used to factor images into a combination of sub-frames.

In another example, a principal component analysis (PCA), which is known in the art, can be used to process a target image to be rendered. PCA is a statistical procedure that uses an orthogonal transformation to convert a set of observations of possibly correlated variables into a set of values of linearly uncorrelated variables called principal components. The number of principal components is less than or equal to the number of original variables. PCA or PCA-like factorization methods may also be modified to identify the major visual blocks and update them preferentially to give the perception of faster response.

In another example, wavelet decomposition, which is known in the art, can be used to process a target image to be rendered. Wavelet decomposition uses a transform which localizes a function both in space and scaling, and has some desirable properties compared to the Fourier transform. The transform is based on a wavelet matrix, which can be computed more quickly than the analogous Fourier matrix. Wavelet methods may be used to identify the major visual blocks and update them preferentially to give the perception of faster response.

In another example, a Hadamard matrix may be used to process a target image to be rendered. The Hadamard matrix is a square matrix whose entries are either +1 or −1 and whose rows are mutually orthogonal. In geometric terms, this means that each pair of rows in a Hadamard matrix represents two perpendicular vectors, while in combinatorial terms, it means that each pair of rows has matching entries in exactly half of their columns and mismatched entries in the remaining columns. It is a consequence of this definition that the corresponding properties hold for columns as well as rows.

In another example, quadratic unconstrained binary optimization (QUBO), which is known in the art, may be used to process a target image to be rendered. QUBO is directed to finding an optimum of a quadratic function $x^T Q x$ of binary variables $x \in \{0, 1\}$. It can be used to give the decomposition of $V \approx R*C$ where R and C are binary row and column matrices of the frame update. Each element of R and C becomes an element of x, and the matrix Q is chosen such that $x^T Q x$ represents the squared Euclidean difference between V and R*C. Different approaches for QUBO problems include local neighbor search (LNS) and quantum annealing.

In a further example, different gradient methods (e.g., gradient decent, conjugate gradient and stochastic gradient decent) can provide solutions to the $V \approx R*C$ decomposition minimizing the Euclidean difference between V and R*C as a function of the elements of R and C.

The terminology used herein is for the purpose of describing particular embodiments only and is not intended to be limiting. Notwithstanding, several definitions that apply throughout this document now will be presented.

As defined herein, the term "visual saliency" means a prominence or importance of information presented in an image.

As defined herein, the term "automatically" means without user intervention.

As defined herein, the term "user" means a person (i.e., a human being).

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "display driver" means at least one hardware circuit that provides an interface function between a processor or image/video decoder and a display panel. A display driver may include, for example, a processor, a controller, an application specific integrated circuit (ASIC), or any other suitable hardware components.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "user" means a human being.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "output" means storing in physical memory elements, e.g., devices, writing to display or other peripheral output device, sending or transmitting to another system, exporting, or the like.

The terms first, second, etc. may be used herein to describe various elements. These elements should not be limited by these terms, as these terms are only used to distinguish one element from another unless stated otherwise or the context clearly indicates otherwise.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    determining a respective level of visual saliency for each of a plurality of pieces of information presented in a target image by analyzing the target image;
    determining, using a processor, at least a first sub-frame update for a display panel, the at least first sub-frame update providing at least a partial rendering of the target image on the display panel, the at least partial rendering of the target image providing the information presented in the target image that is determined to have a highest level of visual saliency from among the plurality of pieces of information; and applying the at least first sub-frame update to the display panel, wherein the applying the at least the first sub-frame update to the display panel comprises driving a plurality of rows of the display panel simultaneously with driving a plurality of columns of the display panel, wherein the driving the plurality of rows of the display panel simultaneously with driving the plurality of columns of the display panel activates pixels at intersections of respective rows and respective columns of the display panel.

2. The method of claim 1, wherein the analyzing the target image to determine the respective level of visual saliency for each of the plurality of pieces of information presented in the target image comprises:
   determining the piece of information depicted in the target image, or at least one visual feature of the piece of information depicted in the target image, that is distinctive; and
   assigning to the determined piece of information a visual saliency value indicating a level of distinctiveness of the information or a level of distinctiveness of the at least one visual feature of the piece of information.

3. The method of claim 1, wherein the analyzing the target image to determine the respective level of visual saliency for each of the plurality of pieces of information presented in the target image comprises:
   determining the piece of information depicted in the target image, or at least one visual feature of the piece of information depicted in the target image, that satisfies user specified preferences; and
   assigning to the determined piece of information a visual saliency value indicating a level of correlation of the information with the user specified preferences or a level of correlation of the at least one visual feature of the piece of information with the user specified preferences.

4. The method of claim 1, further comprising:
   determining at least one visual difference between the target image and a current image presented on the display panel;
   wherein the applying the at least the first sub-frame update to the display panel is responsive to determining that the at least one visual difference between the target image and the current image is not below a threshold value.

5. The method of claim 1, wherein switching a pixel of the display panel from an activated state of the pixel to a deactivated state of the pixel is asymmetrically faster than switching the pixel from the deactivated state of the pixel to the activated state of the pixel.

6. The method of claim 1, further comprising:
   in a later sub-frame update for the display panel, deactivating a portion of pixels activated by the at least the first sub-frame update.

7. The method of claim 1, wherein the display panel is a passive matrix display panel.

8. The method of claim 1, wherein the display panel is a bistable passive matrix display panel.

9. The method of claim 8, wherein the bistable passive matrix display panel comprises a smectic A liquid crystal medium.

10. A display, comprising:
    a display panel; and
    a display driver, wherein the display driver is configured to initiate executable operations comprising:
       determining a respective level of visual saliency for each of a plurality of pieces of information presented in a target image by analyzing the target image;
       determining at least a first sub-frame update for the display panel, the at least first sub-frame update providing at least a partial rendering of the target image on the display panel, the at least partial rendering of the target image providing the information presented in the target image that is determined to have a highest level of visual saliency from among the plurality of pieces of information; and
       applying at least the first sub-frame update to the display panel, wherein the applying the at least the first sub-frame update to the display panel comprises driving a plurality of rows of the display panel simultaneously with driving a plurality of columns of the display panel, wherein the driving the plurality of rows of the display panel simultaneously with driving the plurality of columns of the display panel activates pixels at intersections of respective rows and respective columns of the display panel.

11. The display of claim 10, wherein the analyzing the target image to determine the respective level of visual saliency for each of the plurality of pieces of information presented in the target image comprises:
    determining the piece of information depicted in the target image, or at least one visual feature of the piece of information depicted in the target image, that is distinctive; and
    assigning to the determined piece of information a visual saliency value indicating a level of distinctiveness of the information or a level of distinctiveness of the at least one visual feature of the piece of information.

12. The display of claim 10, wherein the analyzing the target image to determine the respective level of visual saliency for each of the plurality of pieces of information presented in the target image comprises:
    determining the piece of information depicted in the target image, or at least one visual feature of the piece of information depicted in the target image, that satisfies user specified preferences; and
    assigning to the determined piece of information a visual saliency value indicating a level of correlation of the information with the user specified preferences or a level of correlation of the at least one visual feature of the piece of information with the user specified preferences.

13. The display of claim 10, the executable operations further comprising:
    determining at least one visual difference between the target image and a current image presented on the display panel;
    wherein the applying the at least the first sub-frame update to the display panel is responsive to determining that the at least one visual difference between the target image and the current image is not below a threshold value.

14. The display of claim 10, wherein switching a pixel of the display panel from an activated state of the pixel to a deactivated state of the pixel is asymmetrically faster than switching the pixel from the deactivated state of the pixel to the activated state of the pixel.

15. The display of claim 10, the executable operations further comprising:
    in a later sub-frame update for the display panel, deactivating a portion of pixels activated by the at least the first sub-frame update.

16. The display of claim 10, wherein the display panel is a passive matrix display panel.

17. The display of claim 10, wherein the display panel is a bistable passive matrix display panel.

18. The display of claim 17, wherein the bistable passive matrix display panel comprises a smectic A liquid crystal medium.

19. A computer program product comprising a computer readable storage medium having program code stored thereon, the program code executable by a display driver to perform operations comprising:

determining a respective level of visual saliency for each of a plurality of pieces of information presented in a target image by analyzing the target image;

determining at least a first sub-frame update for a display panel, the at least first sub-frame update providing at least a partial rendering of the target image on the display panel, the at least partial rendering of the target image providing the information presented in the target image that is determined to have a highest level of visual saliency from among the plurality of pieces of information; and applying the at least first sub-frame update to the display panel, wherein the applying the at least the first sub-frame update to the display panel comprises driving a plurality of rows of the display panel simultaneously with driving a plurality of columns of the display panel, wherein the driving the plurality of rows of the display panel simultaneously with driving the plurality of columns of the display panel activates pixels at intersections of respective rows and respective columns of the display panel.

20. The computer program product of claim 19, wherein the analyzing the target image to determine the respective level of visual saliency for each of the plurality of pieces of information presented in the target image comprises:

determining the piece of information depicted in the target image, or at least one visual feature of the piece of information depicted in the target image, that is distinctive; and assigning to the determined piece of information a visual saliency value indicating a level of distinctiveness of the information or a level of distinctiveness of the at least one visual feature of the piece of information.

21. The computer program product of claim 19, wherein the analyzing the target image to determine the respective level of visual saliency for each of the plurality of pieces of information presented in the target image comprises:

determining the piece of information depicted in the target image, or at least one visual feature of the piece of information depicted in the target image, that satisfies user specified preferences; and assigning to the determined piece of information a visual saliency value indicating a level of correlation of the information with the user specified preferences or a level of correlation of the at least one visual feature of the piece of information with the user specified preferences.

22. The computer program product of claim 19, wherein the program code is executable by the display driver to perform operations further comprising:

determining at least one visual difference between the target image and a current image presented on the display panel;

wherein the applying the at least the first sub-frame update to the display panel is responsive to determining that the at least one visual difference between the target image and the current image is not below a threshold value.

23. The computer program product of claim 19, wherein switching a pixel of the display panel from an activated state of the pixel to a deactivated state of the pixel is asymmetrically faster than switching the pixel from the deactivated state of the pixel to the activated state of the pixel.

24. The computer program product of claim 19, wherein the program code is executable by the display driver to perform operations further comprising:

in a later sub-frame update for the display panel, deactivating a portion of pixels activated by the at least the first sub-frame update.

25. The computer program product of claim 19, wherein the display panel is a passive matrix display panel.

26. The computer program product of claim 19, wherein the display panel is a bistable passive matrix display panel.

27. The computer program product of claim 26, wherein the bistable passive matrix display panel comprises a smectic A liquid crystal medium.

* * * * *